United States Patent
Hu et al.

(10) Patent No.: US 11,339,817 B2
(45) Date of Patent: May 24, 2022

(54) MULTI-MATERIAL COMPONENT AND METHODS OF MAKING THEREOF

(71) Applicants: HONDA MOTOR CO., LTD., Tokyo (JP); COLORADO SCHOOL OF MINES, Golden, CO (US)

(72) Inventors: Jianxun Hu, Dublin, OH (US); Eric Walker, Dublin, OH (US); Zhenzhen Yu, Golden, CO (US); Abdelrahman Abdelmotagaly, Golden, CO (US); Benjamin Schneiderman, Golden, CO (US)

(73) Assignees: HONDA MOTOR CO., LTD., Tokyo (JP); COLORADO SCHOOL OF MINES, Golden, CO (US)

( * ) Notice: Subject to any disclaimer, the term of this patent is extended or adjusted under 35 U.S.C. 154(b) by 55 days.

(21) Appl. No.: 16/785,239

(22) Filed: Feb. 7, 2020

(65) Prior Publication Data

US 2020/0173475 A1   Jun. 4, 2020

Related U.S. Application Data

(63) Continuation-in-part of application No. 15/660,025, filed on Jul. 26, 2017, now Pat. No. 10,640,854.

(60) Provisional application No. 62/933,076, filed on Nov. 8, 2019, provisional application No. 62/833,435, filed on Apr. 12, 2019, provisional application No. 62/802,556, filed on Feb. 7, 2019, provisional application No. 62/525,314, filed on Jun. 27, 2017, (Continued)

(51) Int. Cl.
*B32B 15/01* (2006.01)
*F16B 5/08* (2006.01)
*B23K 9/007* (2006.01)
*B32B 7/05* (2019.01)

(52) U.S. Cl.
CPC ............... *F16B 5/08* (2013.01); *B23K 9/007* (2013.01); *B32B 7/05* (2019.01); *B32B 15/011* (2013.01); *Y10T 428/12757* (2015.01); *Y10T 428/12771* (2015.01)

(58) Field of Classification Search
None
See application file for complete search history.

(56) References Cited

U.S. PATENT DOCUMENTS 2,481,614 A   9/1949   Redmond
2,914,641 A   11/1959  Yuhasz
(Continued)

FOREIGN PATENT DOCUMENTS

CN   1413792 A   4/2003
CN   101284339 A   10/2008
(Continued)

OTHER PUBLICATIONS

Dongyue Li et al. "The ultrahigh charpy impact toughness of forged AlxCoCrFeNi high entropy alloys at room and cryogenic temperatures", Intermetallics, 2016, vol. 70, pp. 24-28.
(Continued)

*Primary Examiner* — Daniel J. Schleis
(74) *Attorney, Agent, or Firm* — ArentFox Schiff LLP

(57) ABSTRACT

A multi-material component joined by a high entropy alloy is provided, as well as methods of making a multi-material component by joining materials with high entropy alloys to reduce or eliminate liquid metal embrittlement (LME) cracks.

23 Claims, 25 Drawing Sheets

Related U.S. Application Data provisional application No. 62/395,790, filed on Sep. 16, 2016, provisional application No. 62/371,032, filed on Aug. 4, 2016.

(56) References Cited

U.S. PATENT DOCUMENTS

| | | | |
|---|---|---|---|
| 5,021,106 A | 6/1991 | Iwai et al. | |
| 5,858,131 A | 1/1999 | Inoue et al. | |
| 6,056,802 A | 5/2000 | Kita et al. | |
| 6,123,899 A | 9/2000 | Selzer et al. | |
| 6,296,953 B1 | 10/2001 | Linden et al. | |
| 6,436,339 B1 | 8/2002 | Maziasz et al. | |
| 6,692,585 B2 | 2/2004 | Uehara et al. | |
| 6,783,730 B2 | 8/2004 | Lin et al. | |
| 7,700,198 B2 | 4/2010 | Takeda et al. | |
| 7,767,314 B2 | 8/2010 | Kodama et al. | |
| 7,815,850 B2 | 10/2010 | Baker et al. | |
| 8,221,899 B2 | 7/2012 | Takeda et al. | |
| 8,337,998 B2 | 12/2012 | Takeda et al. | |
| 8,487,210 B2 | 7/2013 | Specht et al. | |
| 8,641,835 B2 | 2/2014 | Yamana et al. | |
| 8,647,450 B2 | 2/2014 | Kikuchi et al. | |
| 8,815,027 B2 | 8/2014 | Ishida et al. | |
| 8,999,233 B2 | 4/2015 | Baker | |
| 9,150,945 B2 | 10/2015 | Bei | |
| 9,999,939 B2 | 6/2018 | Wang et al. | |
| 10,640,854 B2 * | 5/2020 | Hu | B23K 31/02 |
| 2002/0159914 A1 | 10/2002 | Yeh | |
| 2004/0261916 A1 | 12/2004 | Lin et al. | |
| 2005/0218121 A1 | 10/2005 | Hayashi et al. | |
| 2007/0154342 A1 | 7/2007 | Tu et al. | |
| 2008/0292489 A1 | 11/2008 | Yamamoto et al. | |
| 2009/0017328 A1 | 1/2009 | Katoh et al. | |
| 2009/0110955 A1 | 4/2009 | Hartmann et al. | |
| 2010/0218858 A1 | 9/2010 | Baker et al. | |
| 2011/0041967 A1 | 2/2011 | Baker et al. | |
| 2011/0058980 A1 | 3/2011 | Lee et al. | |
| 2011/0305506 A1 | 12/2011 | Breitenbach et al. | |
| 2012/0003114 A1 | 1/2012 | Baker et al. | |
| 2012/0263971 A1 | 10/2012 | Aindow et al. | |
| 2012/0301309 A1 | 11/2012 | Nishioka et al. | |
| 2013/0299038 A1 | 11/2013 | Specht et al. | |
| 2014/0086785 A1 | 3/2014 | Claude et al. | |
| 2014/0097277 A1 | 4/2014 | Kumta et al. | |
| 2014/0131338 A1 | 5/2014 | Postle | |
| 2014/0286821 A1 | 9/2014 | Baker et al. | |
| 2015/0096962 A1 | 4/2015 | Sigler et al. | |
| 2015/0275340 A1 | 10/2015 | Berry et al. | |
| 2016/0025386 A1 | 1/2016 | Barabash et al. | |
| 2016/0158898 A1 | 6/2016 | Wiehl | |
| 2016/0201169 A1 | 7/2016 | Vecchio et al. | |
| 2016/0279732 A1 | 9/2016 | Sigler et al. | |
| 2017/0297136 A1 | 10/2017 | Brown et al. | |
| 2017/0326690 A1 | 11/2017 | Heard et al. | |
| 2017/0369970 A1 | 12/2017 | Yeh et al. | |
| 2018/0036840 A1 | 2/2018 | Hu et al. | |
| 2018/0036884 A1 | 2/2018 | Chen et al. | |
| 2018/0037968 A1 | 2/2018 | Hiraide et al. | |
| 2018/0056432 A1 | 3/2018 | Lindner et al. | |
| 2018/0363104 A1 | 12/2018 | Fujieda et al. | |
| 2019/0232419 A1 | 8/2019 | Hahnlen | |

FOREIGN PATENT DOCUMENTS

| | | | |
|---|---|---|---|
| CN | 101405105 A | 4/2009 | |
| CN | 101554685 A | 10/2009 | |
| CN | 101554686 A | 10/2009 | |
| CN | 101590574 A | 12/2009 | |
| CN | 101554685 B | 7/2011 | |
| CN | 101554686 B | 11/2011 | |
| CN | 102676904 A | 9/2012 | |
| CN | 102883852 A | 1/2013 | |
| CN | 103060797 A | 4/2013 | |
| CN | 103252568 A | 8/2013 | |
| CN | 102676904 B | 10/2013 | |
| CN | 103556146 A | 2/2014 | |
| CN | 103567663 A | 2/2014 | |
| CN | 102672328 B | 6/2014 | |
| CN | 104411423 A | 3/2015 | |
| CN | 104476010 A | 4/2015 | |
| CN | 103567663 B | 7/2015 | |
| CN | 103567654 B | 9/2015 | |
| CN | 105164290 A | 12/2015 | |
| CN | 103252568 B | 1/2016 | |
| CN | 103556146 B | 1/2016 | |
| CN | 105401038 A | 3/2016 | |
| CN | 103639619 B | 4/2016 | |
| CN | 104476010 B | 6/2016 | |
| CN | 104476011 B | 6/2016 | |
| CN | 106086580 A | 11/2016 | |
| CN | 107686928 A | 2/2018 | |
| CN | 107999991 A | 5/2018 | |
| CN | 108161276 A | 5/2018 | |
| CN | 108161277 A | 6/2018 | |
| CN | 108161278 A | 6/2018 | |
| CN | 108747006 A | 11/2018 | |
| CN | 108907508 A | 11/2018 | |
| CN | 109016728 A | 12/2018 | |
| CN | 109604963 A | 4/2019 | |
| CN | 109628771 A | 4/2019 | |
| CN | 109848514 A | 6/2019 | |
| CN | 109955004 A | 7/2019 | |
| CN | 109967850 A | 7/2019 | |
| CN | 109967852 A | 7/2019 | |
| CN | 110219002 A | 9/2019 | |
| CN | 110241354 A | 9/2019 | |
| CN | 110273153 A | 9/2019 | |
| CN | 110284032 A | 9/2019 | |
| CN | 110284042 A | 9/2019 | |
| DE | 102017007943 A1 | 2/2018 | |
| JP | 11-197846 A | 7/1999 | |
| JP | 2002-173732 A | 6/2002 | |
| JP | 2004-223548 A | 8/2004 | |
| JP | 2008-231493 A | 10/2008 | |
| KR | 10-2019-0108413 A | 9/2019 | |
| WO | WO 2013/077113 A1 | 5/2013 | |
| WO | WO 2017/098848 A1 | 6/2017 | |
| WO | WO 2017/109541 A1 | 6/2017 | |
| WO | WO 2017/164602 A1 | 9/2017 | |

OTHER PUBLICATIONS

Fanling Meng et al. "The effects of chromium on the microstructure and tensile behavior of Fe30Ni20Mn35Al15", Materials Science & Engineering A, 2013, vol. 586, pp. 45-52.

Gali et al., "Tensile Properties of high- and medium-entropy alloys", Apr. 18, 2013, Intermetallics, vol. 39, pp. 74-78. (Year: 2013).

Hsuan-Ping Chou, "Microstructure, thermophysical and electrical properties in AlxCoCrFeNi (0≤x≤ 2) high-entropy alloys", Materials Science and Engineering B, 2009, vol. 163, pp. 184-189.

K.G. Pradeep et al. "Non-equiatomic high entropy alloys: Approach towards rapid alloy screening and property-oriented design", Materials Science & Engineering A, 2015, vol. 648, pp. 183-192.

Liming Liu et al. "A Review of Dissimilar Welding Techniques for Magnesium Alloys to Aluminum Alloys", Materials, 2014, vol. 7, pp. 3735-3757.

Miracle et al., "Exploration and Development of High Entropy Alloys for Structural Applications", Jan. 10, 2014, Entropy, vol. 16, pp. 494-525, (Year: 2014).

S. W. Wu et al. "Strong grain-size effect on deformation twinning of an Al0.1CoCrFeNi high-entropy alloy", Materials Research Letters, Nov. 21, 2016, 5:4, 276-283, DOI: 10.1080/21663831.2016. 1257514.

Tengfei Yang et al. "Precipitation behavior of AlxCoCrFeNi high entropy alloys under ion irradiation", Scientific Reports, Aug. 26, 2016, vol. 6, 32146, Nature Publishing Group.

Tieshan Cao et al. "The influence of Al elements on the structure and the creep behavior of AlxCoCrFeNi high entropy alloys", Materials Letters, 2016, 1vol. 64. pp. 344-347.

(56) References Cited

OTHER PUBLICATIONS

VIP, "Spot Welding vs. TIG/MIG Welding", http://www.vista-industrial.com/blog/spot-welding/, Sep. 21, 2012, accessed Jun. 21, 2019. (Year: 2012).

Wikipedia, "High Entropy Alloys", https://en.wikipedia.org/wlki/High_entropy_alloys, accessed Jun. 21, 2019.

Woei-Ren Wang, et al. "Effects of Al addition on the microstructure and mechanical property of AlxCoCrFeNi high-entropy alloys", Intermetallics, 2012, vol. 26, pp. 44-51.

Yeh et al., "Nanostructure High-Entropy Alioys with Multiple Principal Elements: Novel Alloy Design Concepts and Outcomes", 2004, Advanced Enaineering Materials, vol. 6 No. 5, pp. 299-302. (Year: 2004).

Yunzhu Shi et al. "Corrosion-Resistant High-Entropy Alloys: A Review", Metals, 2017, vol. 7(2), 43: DOI:10.3390.

Zhi Tang, "Processing, Microstructures, and Mechanical Behavior of High-Entropy Alloys", Dec. 2012, University of Tennessee, Knoxville.

International Search Report and Written Opinion, issued by International Searching Authority in related International Application No. PCT/US2020/017278, dated Apr. 29, 2020.

Liu, Qibin et al., Laser Preparation and Application of Advanced Materials, Beijing Metallurgical Industry Press, (10 Pages Total), (2016).

Xu, Jinfeng et al., Design and Preparation of Welding Materials Applied to Welding Titanium and Steel Based on Weldmetal High Entropy Coverting, Foundry Technology, vol. 35, No. 11, pp. 2674-2676, Nov. 2014. (Includes English Abstract).

Communication dated Jun. 17, 2021, from the State Intellectual Property Office of People's Republic of China in related Application No. 201710655985.5.

Communication dated May 4, 2018, issued by the German Patent Office in counterpart German Application No. 10 2017 213 391.0.

Zu, Guoyin, Preparation Theory and Technology of Layered Metal Composite Materials, Northeastern University Postgraduate Textbook Construction Project Funding Project Liaoning Province Thousands of Talents Project Training Fund Support, Northeast University Press, Shenyang, (8 Pages Total), (2013).

\* cited by examiner

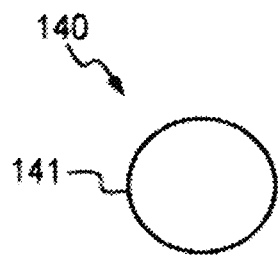 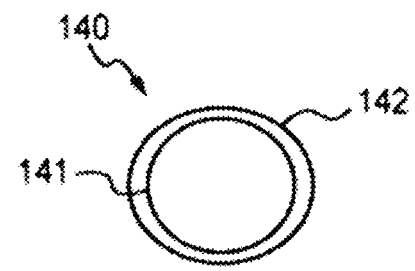
FIG. 3A  FIG. 3B
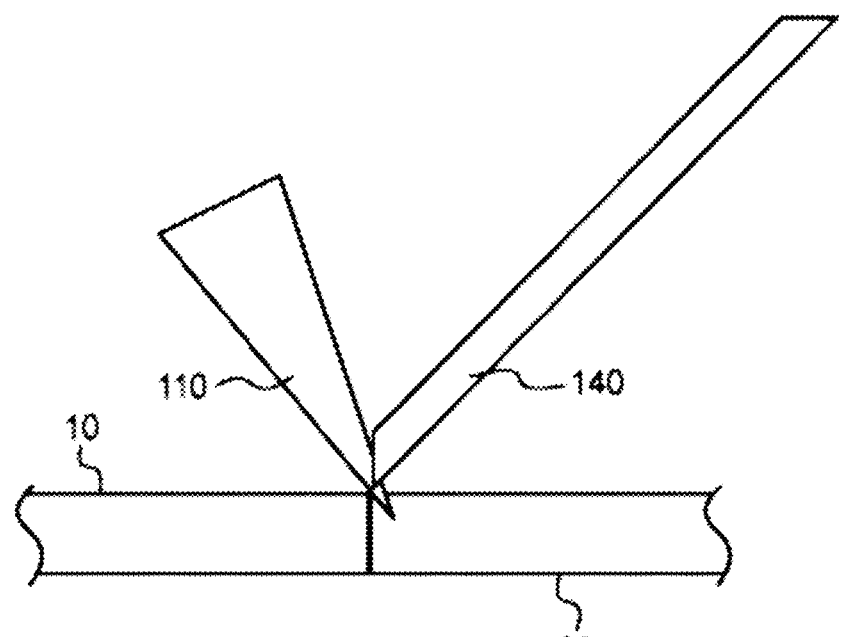
FIG. 4

MULTI-MATERIAL COMPONENT AND METHODS OF MAKING THEREOF

CROSS-REFERENCE TO RELATED APPLICATIONS

This application is a continuation-in-part of U.S. patent application Ser. No. 15/660,025, entitled "MULTI-MATERIAL COMPONENT AND METHODS OF MAKING THEREOF," filed on Jul. 26, 2017, which claims benefit to U.S. Provisional Patent Application Ser. No. 62/371,032 entitled "MULTI-MATERIAL COMPONENT AND METHODS OF MAKING THEREOF, AND A CONSUMABLE WELDING FILLER AND METHODS OF MAKING AND USING THEREOF," filed on Aug. 4, 2016, U.S. Provisional Patent Application Ser. No. 62/395,790, entitled "MULTI-MATERIAL COMPONENT AND METHODS OF MAKING THEREOF, AND A CONSUMABLE WELDING FILLER AND METHODS OF MAKING AND USING THEREOF," filed on Sep. 16, 2016, and U.S. Provisional Patent Application Ser. No. 62/525,314 entitled "MULTI-MATERIAL COMPONENT AND METHODS OF MAKING THEREOF," filed on Jun. 27, 2017. This application also claims benefit to U.S. Provisional Patent Application Ser. No. 62/802,556, entitled "MULTI-MATERIAL COMPONENT AND METHODS OF MAKING THEREOF," filed Feb. 7, 2019; U.S. Provisional Patent Application Ser. No. 62/833,435, entitled MULTI-MATERIAL COMPONENT AND METHODS OF MAKING THEREOF," filed Apr. 12, 2019, and U.S. Provisional Patent Application Ser. No. 62/933,076, entitled MULTI-MATERIAL COMPONENT AND METHODS OF MAKING THEREOF," filed Nov. 8, 2019. The disclosure of each above-noted application is incorporated herein by reference.

BACKGROUND

The substitution of lightweight metals or metal alloys for low-carbon steel or other types of steel used in motor vehicles is an attractive option for vehicle mass reduction. Often, however, the remainder of the vehicle body structure is fabricated of a dissimilar material. The joining of dissimilar materials can be problematic due to the differences in physical and metallurgical properties between the two different metals. For example, joining an aluminum or aluminum-based alloy to steel can result in the formation of intermetallic compounds which deteriorate the mechanical properties of the joint and cause corrosion issues, and therefore, requires additional manufacturing steps or safeguards to prevent mechanical strength degradation and galvanic corrosion.

In addition, when resistance spot welding is used to join iron or steel parts having a zinc (Zn)-containing coating, such as galvanized and/or galvannealed iron or steel, to other iron or steel parts and/or to dissimilar materials, the low melting point of the coating, as well as the applied load by the welding electrodes, may cause diffusion of Zn into the iron and/or steel, leading to liquid metal embrittlement (LME) cracking.

SUMMARY

In general, a high entropy alloy (HEA) is provided that may be used for joining dissimilar or similar metals or metal alloys, wherein one or more of the metal or metal alloys comprises iron and/or steel with a coating, wherein the coating comprises Zn (alternatively referred to herein as a "Zn coating"). According to some aspects, the Zn coating may be a metal or metal alloy coating that comprises more than about 50% w/w of a metal or metal alloy, optionally more than about 75% w/w, optionally more than about 90% w/w, optionally more than about 95% w/w, and optionally more than about 99% w/w. According to some aspects, the Zn coating may consist of a metal or metal alloy. According to some aspects, the Zn coating may correspond with the coating of a material that has been galvanized and/or galvannealed. According to some aspects, an HEA is provided that may be used for joining a first iron and/or steel having a Zn coating with a second iron and/or steel, optionally having a Zn coating, and/or for joining a first iron and/or steel having a Zn coating with another metal or metal alloy. High entropy alloys promote formation of solid solution and prohibit intermetallics especially at high temperatures. As a result, the high entropy alloys provide mechanical strength and corrosion resistance of the welding joint for joining dissimilar materials. The high entropy alloys may additionally or alternatively reduce the diffusion of zinc into iron and/or steel during resistance spot welding processes, which may reduce or eliminate LME cracking.

In accordance with one embodiment, a multi-material component is provided that includes a first member comprising a metal or a metal alloy, particularly iron and/or steel having a Zn coating, a second member comprising a metal or a metal alloy, which may or may not be iron and/or steel having a Zn coating, and a third member joining the first member to the second member. The third member comprises a high entropy alloy. Optionally, the metal or metal alloy of the first member is different than the metal or metal alloy of the second member. Optionally, the high entropy alloy comprises a first principal element that is the same as the metal or a base metal of the first member. Optionally, the high entropy alloy comprises a second principal element that is the same as the metal or a base metal of the second member. Optionally, the first member comprises an aluminum alloy and the second member comprises steel. Optionally, the first member and/or the second member each independently comprises iron and/or steel having a Zn coating, and the multi-material component is substantially free of LME cracking.

Optionally, the high entropy alloy comprises Al and Fe as principal elements. Optionally, the high entropy alloy comprises Al, Fe, and Mn as principal elements. Optionally, the high entropy alloy comprises at least Fe as a principal element. Optionally, the high entropy alloy comprises at least Mn as a principal element. Optionally, the high entropy alloy comprises at least Ni as a principal element. Optionally, the high entropy alloy comprises at least Co as a principal element. Optionally, the high entropy alloy comprises at least Zn as a principal element. Optionally, the high entropy alloy comprises at least Cu as a principal element. Optionally, the high entropy alloy comprises at least Cr as a principal element.

Optionally, the high entropy alloy comprises four principal elements. Optionally, the high entropy alloy comprises five principal elements. Optionally, the high entropy alloy comprises six principal elements. Optionally, the high entropy alloy comprises seven or more principal elements. According to some aspects, one or more of the principal elements may be principal minor elements. Optionally, the high entropy alloy comprises five or more principal elements including: Al, Fe, Mn, Cr, and Ni. Optionally, the high entropy alloy comprises four or more principal elements including Cu, Co, and/or Zn. Optionally, the high entropy alloy comprises five, six, seven, or more principal elements including Cu, Co, and/or Zn. Optionally, the high entropy alloy comprises at least four principal major elements selected from the group consisting of Fe, Mn, Ni, Co, Cu, and Cr, and optionally Zn as a fifth principal element, which may be present as a principal major element or a principal minor element.

In accordance with one embodiment, a method of making a multi-material component is provided that includes providing a first member comprising a metal or a metal alloy as described herein, providing a second member comprising a metal or a metal alloy as described herein, positioning a third member at least partially between the first member and the second member, and joining the first member and the second member to the third member. The third member comprises a high entropy alloy. Optionally, the first member and the second member are joined to the third member by welding. Optionally, the metal or metal alloy of the first member is different than the metal or metal alloy of the second member. Optionally, the high entropy alloy comprises a first principal element that is the same as the metal or a base metal of the first member. Optionally, the high entropy alloy comprises a second principal element that is the same as the metal or a base metal of the second member. Optionally, the first member comprises an aluminum alloy and the second member comprises steel. Optionally, the first member comprises iron and/or steel having a Zn coating. Optionally, the second member comprises iron and/or steel, optionally having a Zn coating, wherein the second member is formed from the same material as the first member or is formed from a different material from the first member.

Optionally, the high entropy alloy comprises Al and Fe as principal elements. Optionally, the high entropy alloy comprises Al, Fe, and Mn as principal elements. Optionally, the high entropy alloy comprises at least Fe as a principal element. Optionally, the high entropy alloy comprises at least Mn as a principal element. Optionally, the high entropy alloy comprises at least Ni as a principal element. Optionally, the high entropy alloy comprises at least Co as a principal element. Optionally, the high entropy alloy comprises at least Zn as a principal element. Optionally, the high entropy alloy comprises at least Cu as a principal element. Optionally, the high entropy alloy comprises at least Cr as a principal element.

Optionally, the high entropy alloy comprises four principal elements. Optionally, the high entropy alloy comprises five principal elements. Optionally, the high entropy alloy comprises six principal elements. Optionally, the high entropy alloy comprises seven or more principal elements. According to some aspects, one or more of the principal elements may be principal minor elements. Optionally, the high entropy alloy comprises five or more principal elements including: Al, Fe, Mn, Cr, and Ni. Optionally, the high entropy alloy comprises at least four principal major elements selected from the group consisting of Fe, Mn, Ni, Co, Cu, and Cr, and optionally Zn as a fifth principal element, which may be present as a principal major element or a principal minor element.

In accordance with one embodiment, a method of making a multi-material component is provided that includes providing a first member comprising a metal or a metal alloy as described herein, providing a second member comprising a metal or a metal alloy as described herein, and joining the first member to the second member with a material comprising a high entropy alloy as described herein or a high entropy alloy precursor composition that forms a high entropy alloy as described herein when melted. The joining step may include welding the first member to the second member with the material, or cladding the material over the first member and the second member. Optionally, the metal or metal alloy of the first member is different than the metal or metal alloy of the second member. Optionally, the high entropy alloy comprises a first principal element that is the same as the metal or a base metal of the first member. Optionally, the high entropy alloy comprises a second principal element that is the same as the metal or a base metal of the second member. Optionally, the first member comprises an aluminum alloy and the second member comprises steel. Optionally, the first member comprises iron and/or steel having a Zn coating. Optionally, the second member comprises iron and/or steel, optionally having a Zn coating, wherein the second member is formed from the same material as the first member or is formed from a different material from the first member.

In accordance with one embodiment, a welding consumable is provided that includes a filler material comprising a high entropy alloy as described herein or a high entropy alloy precursor composition capable of forming a high entropy alloy as described herein when welded.

In accordance with one embodiment, a multi-material component is provided that includes a first member comprising a metal or a metal alloy as described herein, a second member comprising a metal or a metal alloy as described herein, including a metal or metal alloy having a Zn coating as described herein, wherein the second member comprises a metal or a metal alloy as described herein that is the same as or different from the metal or the metal alloy of the first member, and a third member joining the first member to the second member, wherein the third member comprises a high entropy alloy. Optionally, the high entropy alloy may comprise a mixing entropy of greater than 1.3R, and optionally may comprise a mixing entropy of greater than 1.5R.

Optionally, the high entropy alloy as described above comprises at least four elements each present in the high entropy alloy in an amount of from 5 to 35 atomic %. Optionally two of the at least four elements that are each present in the high entropy alloy in an amount of from 5 to 35 atomic % comprise Fe and Cr and the amount of the Fe and Cr vary by no more than 5 atomic % with respect to each other, optionally two of the at least four elements that are each present in the high entropy alloy in an amount of from 5 to 35 atomic % comprise Fe and Ni and the amount of the Fe and Ni vary by no more than 5 atomic % with respect to each other, optionally two of the at least four elements that are each present in the high entropy alloy in an amount of from 5 to 35 atomic % comprise Cr and Ni and the amount of the Ni and Cr vary by no more than 5 atomic % with respect to each other, optionally two of the at least four elements that are each present in the high entropy alloy in an amount of from 5 to 35 atomic % comprise Fe and Al and the amount of the Fe and Al vary by no more than 5 atomic % with respect to each other, optionally two of the at least four elements that are each present in the high entropy alloy in an amount of from 5 to 35 atomic % comprise Al and Ni and the amount of the Al and Ni vary by no more than 5 atomic % with respect to each other, optionally two of the at least four elements that are each present in the high entropy alloy in an amount of from 5 to 35 atomic % comprise Al and Cr and the amount of the Al and Cr vary by no more than 5 atomic % with respect to each other, optionally two of the at least four elements that are each present in the high entropy alloy in an amount of from 5 to 35 atomic % comprise Cu and Co, and the amount of the Cu and Co vary by no more than 5 atomic % with respect to each other, optionally two of the at least four elements that are each present in the high entropy alloy in an amount of from 5 to 35 atomic % comprise Cu and Zn, and the amount of the Cu and Zn vary by no more than 5 atomic % with respect to each other, and optionally two of the at least four elements that are each present in the high entropy alloy in an amount of from 5 to 35 atomic % comprise Co and Zn, and the amount of the Co and Zn vary by no more than 5 atomic % with respect to each other.

Optionally, the high entropy alloy as described above comprises at least five elements each present in the high entropy alloy in an amount of from 5 to 35 atomic %. Optionally two of the at least five elements that are each present in the high entropy alloy in an amount of from 5 to 35 atomic % comprise Fe and Cr and the amount of the Fe and Cr vary by no more than 5 atomic % with respect to each other, optionally two of the at least five elements that are each present in the high entropy alloy in an amount of from 5 to 35 atomic % comprise Fe and Ni and the amount of the Fe and Ni vary by no more than 5 atomic % with respect to each other, optionally two of the at least five elements that are each present in the high entropy alloy in an amount of from 5 to 35 atomic % comprise Cr and Ni and the amount of the Ni and Cr vary by no more than 5 atomic % with respect to each other, optionally two of the at least five elements that are each present in the high entropy alloy in an amount of from 5 to 35 atomic % comprise Fe and Al and the amount of the Fe and Al vary by no more than 5 atomic % with respect to each other, optionally two of the at least five elements that are each present in the high entropy alloy in an amount of from 5 to 35 atomic % comprise Al and Ni and the amount of the Al and Ni vary by no more than 5 atomic % with respect to each other, optionally two of the at least five elements that are each present in the high entropy alloy in an amount of from 5 to 35 atomic % comprise Al and Cr and the amount of the Al and Cr vary by no more than 5 atomic % with respect to each other, optionally two of the at least five elements that are each present in the high entropy alloy in an amount of from 5 to 35 atomic % comprise Cu and Co, and the amount of the Cu and Co vary by no more than 5 atomic % with respect to each other, optionally two of the at least five elements that are each present in the high entropy alloy in an amount of from 5 to 35 atomic % comprise Cu and Zn, and the amount of the Cu and Zn vary by no more than 5 atomic % with respect to each other, and optionally two of the at least five elements that are each present in the high entropy alloy in an amount of from 5 to 35 atomic % comprise Co and Zn, and the amount of the Co and Zn vary by no more than 5 atomic % with respect to each other.

Optionally, the high entropy alloy as described above comprises at least six elements each present in the high entropy alloy in an amount of from 5 to 35 atomic %. Optionally two of the at least six elements that are each present in the high entropy alloy in an amount of from 5 to 35 atomic % comprise Fe and Cr and the amount of the Fe and Cr vary by no more than 5 atomic % with respect to each other, optionally two of the at least six elements that are each present in the high entropy alloy in an amount of from 5 to 35 atomic % comprise Fe and Ni and the amount of the Fe and Ni vary by no more than 5 atomic % with respect to each other, optionally two of the at least six elements that are each present in the high entropy alloy in an amount of from 5 to 35 atomic % comprise Cr and Ni and the amount of the Ni and Cr vary by no more than 5 atomic % with respect to each other, optionally two of the at least six elements that are each present in the high entropy alloy in an amount of from 5 to 35 atomic % comprise Fe and Al and the amount of the Fe and Al vary by no more than 5 atomic % with respect to each other, optionally two of the at least six elements that are each present in the high entropy alloy in an amount of from 5 to 35 atomic % comprise Al and Ni and the amount of the Al and Ni vary by no more than 5 atomic % with respect to each other, optionally two of the at least six elements that are each present in the high entropy alloy in an amount of from 5 to 35 atomic % comprise Al and Cr and the amount of the Al and Cr vary by no more than 5 atomic % with respect to each other, optionally two of the at least six elements that are each present in the high entropy alloy in an amount of from 5 to 35 atomic % comprise Cu and Co, and the amount of the Cu and Co vary by no more than 5 atomic % with respect to each other, optionally two of the at least six elements that are each present in the high entropy alloy in an amount of from 5 to 35 atomic % comprise Cu and Zn, and the amount of the Cu and Zn vary by no more than 5 atomic % with respect to each other, and optionally two of the at least six elements that are each present in the high entropy alloy in an amount of from 5 to 35 atomic % comprise Co and Zn, and the amount of the Co and Zn vary by no more than 5 atomic % with respect to each other.

Optionally, the high entropy alloy as described above comprises at least seven elements each present in the high entropy alloy in an amount of from 5 to 35 atomic %. Optionally two of the at least seven elements that are each present in the high entropy alloy in an amount of from 5 to 35 atomic % comprise Fe and Cr and the amount of the Fe and Cr vary by no more than 5 atomic % with respect to each other, optionally two of the at least seven elements that are each present in the high entropy alloy in an amount of from 5 to 35 atomic % comprise Fe and Ni and the amount of the Fe and Ni vary by no more than 5 atomic % with respect to each other, optionally two of the at least seven elements that are each present in the high entropy alloy in an amount of from 5 to 35 atomic % comprise Cr and Ni and the amount of the Ni and Cr vary by no more than 5 atomic % with respect to each other, optionally two of the at least seven elements that are each present in the high entropy alloy in an amount of from 5 to 35 atomic % comprise Fe and Al and the amount of the Fe and Al vary by no more than 5 atomic % with respect to each other, optionally two of the at least seven elements that are each present in the high entropy alloy in an amount of from 5 to 35 atomic % comprise Al and Ni and the amount of the Al and Ni vary by no more than 5 atomic % with respect to each other, optionally two of the at least seven elements that are each present in the high entropy alloy in an amount of from 5 to 35 atomic % comprise Al and Cr and the amount of the Al and Cr vary by no more than 5 atomic % with respect to each other, optionally two of the at least seven elements that are each present in the high entropy alloy in an amount of from 5 to 35 atomic % comprise Cu and Co, and the amount of the Cu and Co vary by no more than 5 atomic % with respect to each other, optionally two of the at least seven elements that are each present in the high entropy alloy in an amount of from 5 to 35 atomic % comprise Cu and Zn, and the amount of the Cu and Zn vary by no more than 5 atomic % with respect to each other, and optionally two of the at least seven elements that are each present in the high entropy alloy in an amount of from 5 to 35 atomic % comprise Co and Zn, and the amount of the Co and Zn vary by no more than 5 atomic % with respect to each other.

Optionally three of the at least four elements that are each present in the high entropy alloy in an amount of from 5 to 35 atomic % comprise Fe, Ni, and Cr and the amount of the Fe, Ni, and Cr vary by no more than 5 atomic % with respect to each other, optionally three of the at least four elements that are each present in the high entropy alloy in an amount of from 5 to 35 atomic % comprise Fe, Al, and Ni and the amount of the Fe, Al, and Ni vary by no more than 5 atomic % with respect to each other, optionally three of the at least four elements that are each present in the high entropy alloy in an amount of from 5 to 35 atomic % comprise Al, Cr, and Ni and the amount of the Al, Ni, and Cr vary by no more than 5 atomic % with respect to each other, optionally three of the at least four elements that are each present in the high entropy alloy in an amount of from 5 to 35 atomic % comprise Fe, Cr, and Al and the amount of the Fe, Cr, and Al vary by no more than 5 atomic % with respect to each other, and optionally three of the at least four elements that are each present in the high entropy alloy in an amount of from 5 to 35 atomic % comprise Cu, Co, and Zn and the amount of the Cu, Co, and Zn vary by no more than 5 atomic % with respect to each other.

Optionally three of the at least five elements that are each present in the high entropy alloy in an amount of from 5 to 35 atomic % comprise Fe, Ni, and Cr and the amount of the Fe, Ni, and Cr vary by no more than 5 atomic % with respect to each other, optionally three of the at least five elements that are each present in the high entropy alloy in an amount of from 5 to 35 atomic % comprise Fe, Al, and Ni and the amount of the Fe, Al, and Ni vary by no more than 5 atomic % with respect to each other, optionally three of the at least five elements that are each present in the high entropy alloy in an amount of from 5 to 35 atomic % comprise Al, Cr, and Ni and the amount of the Al, Ni, and Cr vary by no more than 5 atomic % with respect to each other, optionally three of the at least five elements that are each present in the high entropy alloy in an amount of from 5 to 35 atomic % comprise Fe, Cr, and Al and the amount of the Fe, Cr, and Al vary by no more than 5 atomic % with respect to each other, and optionally three of the at least five elements that are each present in the high entropy alloy in an amount of from 5 to 35 atomic % comprise Cu, Co, and Zn and the amount of the Cu, Co, and Zn vary by no more than 5 atomic % with respect to each other.

Optionally three of the at least six elements that are each present in the high entropy alloy in an amount of from 5 to 35 atomic % comprise Fe, Ni, and Cr and the amount of the Fe, Ni, and Cr vary by no more than 5 atomic % with respect to each other, optionally three of the at least six elements that are each present in the high entropy alloy in an amount of from 5 to 35 atomic % comprise Fe, Al, and Ni and the amount of the Fe, Al, and Ni vary by no more than 5 atomic % with respect to each other, optionally three of the at least six elements that are each present in the high entropy alloy in an amount of from 5 to 35 atomic % comprise Al, Cr, and Ni and the amount of the Al, Ni, and Cr vary by no more than 5 atomic % with respect to each other, optionally three of the at least six elements that are each present in the high entropy alloy in an amount of from 5 to 35 atomic % comprise Fe, Cr, and Al and the amount of the Fe, Cr, and Al vary by no more than 5 atomic % with respect to each other, and optionally three of the at least six elements that are each present in the high entropy alloy in an amount of from 5 to 35 atomic % comprise Cu, Co, and Zn and the amount of the Cu, Co, and Zn vary by no more than 5 atomic % with respect to each other.

Optionally three of the at least seven elements that are each present in the high entropy alloy in an amount of from 5 to 35 atomic % comprise Fe, Ni, and Cr and the amount of the Fe, Ni, and Cr vary by no more than 5 atomic % with respect to each other, optionally three of the at least seven elements that are each present in the high entropy alloy in an amount of from 5 to 35 atomic % comprise Fe, Al, and Ni and the amount of the Fe, Al, and Ni vary by no more than 5 atomic % with respect to each other, optionally three of the at least seven elements that are each present in the high entropy alloy in an amount of from 5 to 35 atomic % comprise Al, Cr, and Ni and the amount of the Al, Ni, and Cr vary by no more than 5 atomic % with respect to each other, optionally three of the at least seven elements that are each present in the high entropy alloy in an amount of from 5 to 35 atomic % comprise Fe, Cr, and Al and the amount of the Fe, Cr, and Al vary by no more than 5 atomic % with respect to each other, and optionally three of the at least seven elements that are each present in the high entropy alloy in an amount of from 5 to 35 atomic % comprise Cu, Co, and Zn and the amount of the Cu, Co, and Zn vary by no more than 5 atomic % with respect to each other.

Optionally, the high entropy alloy comprises at least four principal major elements. Optionally, the high entropy alloy comprises at least five principal major elements. Optionally, the high entropy alloy comprises at least six principal major elements. Optionally, the high entropy alloy comprises at least seven principal major elements. As used herein, the term "principal major element" refers to a principal element present at a concentration of at least 5 atomic %.

Optionally, the at least four principal major elements may be selected from the group consisting of Fe, Mn, Ni, Co, Cu, and Cr, wherein the amount of at least two of the principal major elements vary by no more than 5 atomic % with respect to each other, optionally wherein the amount of at least three of the principal major elements vary by no more than 5 atomic % with respect to each other, optionally wherein the amount of at least four of the principal major elements vary by no more than 5 atomic % with respect to each other, optionally wherein the amount of at least five of the principal major elements vary by no more than 5 atomic % with respect to each other, optionally wherein the amount of at least six of the principal major elements vary by no more than 5 atomic % with respect to each other, and optionally wherein the amount of at least seven of the principal major elements vary by no more than 5 atomic % with respect to each other.

Optionally, the high entropy alloy comprises at least five principal major elements. Optionally, the at least five principal major elements may be selected from the group consisting of Fe, Mn, Ni, Co, Cu, Cr, and Zn, wherein the amount of at least two of the principal major elements vary by no more than 5 atomic % with respect to each other, optionally wherein the amount of at least three of the principal major elements vary by no more than 5 atomic % with respect to each other, optionally wherein the amount of at least four of the principal major elements vary by no more than 5 atomic % with respect to each other, optionally wherein the amount of at least five of the principal major elements vary by no more than 5 atomic % with respect to each other, optionally wherein the amount of at least six of the principal major elements vary by no more than 5 atomic % with respect to each other, and optionally wherein the amount of at least seven of the principal major elements vary by no more than 5 atomic % with respect to each other.

Optionally, the high entropy alloy comprises at least six principal major elements. Optionally, the at least six principal major elements may be selected from the group consisting of Fe, Mn, Ni, Co, Cu, Cr, and Zn, wherein the amount of at least two of the principal major elements vary by no more than 5 atomic % with respect to each other, optionally wherein the amount of at least three of the principal major elements vary by no more than 5 atomic % with respect to each other, optionally wherein the amount of at least four of the principal major elements vary by no more than 5 atomic % with respect to each other, optionally wherein the amount of at least six of the principal major elements vary by no more than 5 atomic % with respect to each other, optionally wherein the amount of at least six of the principal major elements vary by no more than 5 atomic % with respect to each other, and optionally wherein the amount of at least seven of the principal major elements vary by no more than 5 atomic % with respect to each other.

Optionally, the high entropy alloy comprises at least seven principal major elements. Optionally, the at least seven principal major elements may be selected from the group consisting of Fe, Mn, Ni, Co, Cu, Cr, and Zn, wherein the amount of at least two of the principal major elements vary by no more than 5 atomic % with respect to each other, optionally wherein the amount of at least three of the principal major elements vary by no more than 5 atomic % with respect to each other, optionally wherein the amount of at least four of the principal major elements vary by no more than 5 atomic % with respect to each other, optionally wherein the amount of at least seven of the principal major elements vary by no more than 5 atomic % with respect to each other, optionally wherein the amount of at least seven of the principal major elements vary by no more than 5 atomic % with respect to each other, and optionally wherein the amount of at least seven of the principal major elements vary by no more than 5 atomic % with respect to each other.

In one example, the high entropy alloy comprises at least Fe as a principal major element. In one example, the high entropy alloy comprises at least Mn as a principal major element. In one example, the high entropy alloy comprises at least Ni as a principal major element. In one example, the high entropy alloy comprises at least Co as a principal major element. In one example, the high entropy alloy comprises at least Cu as a principal major element. In one example, the high entropy alloy comprises at least Cr as a principal major element. In one example, the high entropy alloy comprises at least Zn as a principal major element.

In one example, the high entropy alloy comprises at least Fe and Mn as principal major elements. In one example, the high entropy alloy comprises at least Fe and Ni as principal major elements. In one example, the high entropy alloy comprises at least Fe and Co as principal major elements. In one example, the high entropy alloy comprises at least Fe and Cu as principal major elements. In one example, the high entropy alloy comprises at least Fe and Cr as principal major elements. In one example, the high entropy alloy comprises at least Cu and Co as principal major elements. In one example, the high entropy alloy comprises at least Cu and Zn as principal major elements. In one example, the high entropy alloy comprises at least Co and Zn as principal major elements.

In one example, the high entropy alloy comprises at least Fe, Mn, and Ni as principal major elements. In one example, the high entropy alloy comprises at least Fe, Mn, and Co as principal major elements. In one example, the high entropy alloy comprises at least Fe, Mn, and Cu as principal major elements. In one example, the high entropy alloy comprises at least Fe, Mn, and Cr as principal major elements. In one example, the high entropy alloy comprises at least Cu, Co, and Zn as principal major elements.

In one example, the high entropy alloy comprises at least Fe, Ni, and Co as principal major elements. In one example, the high entropy alloy comprises at least Fe, Ni, and Cu as principal major elements. In one example, the high entropy alloy comprises at least Fe, Ni, and Cr as principal major elements. In one example, the high entropy alloy comprises at least Fe, Cu, and Co as principal major elements. In one example, the high entropy alloy comprises at least Fe, Cu, and Zn as principal major elements. In one example, the high entropy alloy comprises at least Fe, Co, and Zn as principal major elements.

In one example, the high entropy alloy comprises Fe, Mn, Ni, and Co as principal major elements. In one example, the high entropy alloy comprises Fe, Mn, Ni, and Cu as principal major elements. In one example, the high entropy alloy comprises Fe, Mn, Co, and Cu as principal major elements. In one example, the high entropy alloy comprises Fe, Mn, Cr, and Ni as principal major elements. In one example, the high entropy alloy comprises Fe, Mn, Cu, and Co as principal major elements. In one example, the high entropy alloy comprises Fe, Mn, Cu, and Zn as principal major elements. In one example, the high entropy alloy comprises Fe, Mn, Co, and Zn as principal major elements.

In one example, the high entropy alloy comprises Fe, Ni, Co, and Cu as principal major elements. In one example, the high entropy alloy comprises Fe, Ni, Cu, and Co as principal major elements. In one example, the high entropy alloy comprises Fe, Ni, Cu, and Zn as principal major elements. In one example, the high entropy alloy comprises Fe, Ni, Co, and Zn as principal major elements.

In one example, the high entropy alloy comprises Fe, Mn, Ni, Co, and Zn as principal major elements. In one example, the high entropy alloy comprises Fe, Mn, Ni, Cu, and Zn as principal major elements. In one example, the high entropy alloy comprises Fe, Mn, Co, Cu, and Zn as principal major elements. In one example, the high entropy alloy comprises Fe, Mn, Cr, Ni, and Zn as principal major elements. In one example, the high entropy alloy comprises Fe, Mn, Cu, Co, and Zn as principal major elements. In one example, the high entropy alloy comprises Fe, Ni, Co, Cu, and Zn as principal major elements. In one example, the high entropy alloy comprises Fe, Ni, Cu, Co, and Zn as principal major elements.

In one example, the high entropy alloy comprises Al, Fe, Mn, Cr, and Cu as principal major elements. In one example, the high entropy alloy comprises Fe, Mn, Ni, Co, and Cu as principal major elements. In one example, the high entropy alloy comprises Mn, Ni, Co, Cu, and Zn as principal major elements. In one example, the high entropy alloy comprises Fe, Mn, Ni, Cr, Co, Cu, and Zn as principal major elements. In one example, the high entropy alloy comprises Al, Fe, Mn, Ni, Cr, Cu, and Zn as principal major elements.

Optionally, the high entropy alloy comprises at least one principal minor element. As used herein, the term "principal minor element" refers to a principal element present at a concentration of less than 5 atomic %. Optionally, the high entropy alloy comprises at least two principal major elements and one principle minor element, optionally at least three principal major elements and one principle minor element, optionally at least four principal major elements and one principle minor element, optionally at least five principal major elements and one principle minor element, optionally at least six principal major elements and one principle minor element, and optionally at least seven principal major elements and one principle minor element. Optionally, the high entropy alloy comprises any combination of principal major elements as described herein and Zn as a principal minor element.

In accordance with one embodiment, a method of making a multi-material component is provided that includes providing a first member comprising a metal or a metal alloy as described herein, providing a second member comprising a metal or a metal alloy, optionally wherein the second member comprises a metal or a metal alloy that is different from the metal or metal alloy of the first member, and joining the first member to the second member with a third member comprising a high entropy alloy as described herein to form the multi-material component. Optionally, the step of joining the first member to the second member with the third member includes positioning the third member between the first member and the second member, and spot welding the first member to the third member and spot welding the second member to the third member. Optionally, the third member is a consumable material and the step of joining the first member to the second member with the third member comprises: melting the consumable material to deposit the high entropy alloy as described herein on the first member and the second member. Optionally, the high entropy alloy as described herein may comprise a mixing entropy of greater than 1.3R, and optionally may comprise a mixing entropy of greater than 1.5 R.

BRIEF DESCRIPTION OF THE DRAWINGS

FIGS. 3A and 3B illustrate welding consumables comprising a high entropy alloy according to one aspect of the present disclosure.

FIG. 4 illustrates a diagram of a laser system for brazing, cladding, building up, filling, hard-facing, overlaying, welding, and joining applications with a high entropy alloy according to one aspect of the present disclosure.

DETAILED DESCRIPTION

Figure 1:
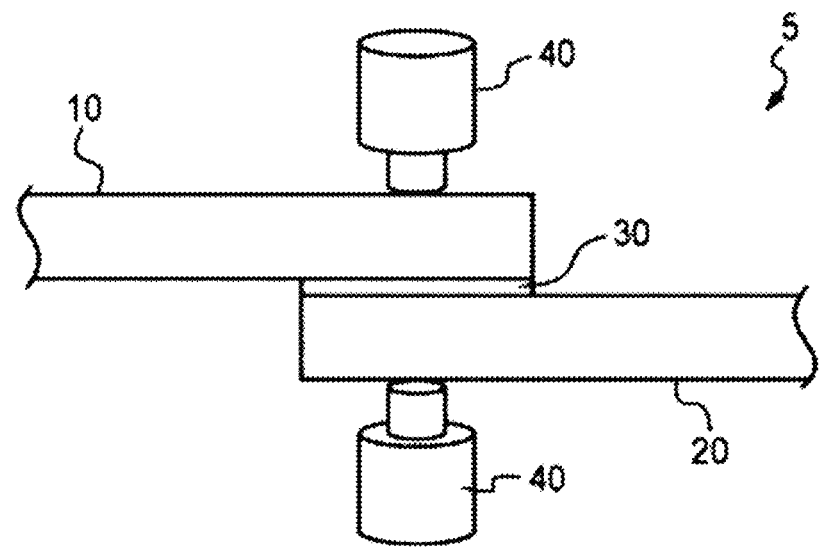
FIG. 1 illustrates a multi-material component joined by spot welding according to one aspect of the present disclosure.

It should be understood that the description and drawings herein are merely illustrative and that various modifications and changes can be made in the compositions, methods and structures disclosed without departing from the present disclosure.

In general, a high entropy alloy is provided for the joining of metals or metal alloys. As used herein, the term "high entropy alloy" refers generally to an alloy comprising four or more principal major elements as described herein having a mixing entropy of greater than 1.3R, wherein the entropy of mixing is determined using the equation $\Delta S_{mix} = R \ln N$, wherein R is the gas constant and N is the total number of elements. The high entropy alloy may comprise equiatomic or near equiatomic of multiple principal elements as described herein. High entropy alloys promote formation of a solid solution and prohibit intermetallics especially at high temperatures. Accordingly, the structure of the solution phases is simply face-centered cubic (FCC) or body centered cubic (BCC) or a combination of the two, as opposed to a multi-phase structure, which is typically seen in conventional alloy materials. In an illustrative example, the high entropy alloy comprises a single phase solid solution with an FCC crystal structure. Such high entropy alloys may have unique physical and mechanical properties because they still have simple crystal structure but their lattices are highly distorted due to atomic size misfit. The structure can also be adjusted by changing the composition level, i.e. it can be transferred from FCC to BCC while increasing the amount of, for example, Al content in an aluminum-containing high entropy alloy. The solid solution phases of the high entropy alloys are stabilized by the significantly high entropy of mixing compared with intermetallic compounds, especially at high temperatures.

As described herein, the entropy of mixing can be determined using the equation $\Delta S_{mix} = R \ln N$, where R is the gas constant and N is the total number of elements. The value of the mixing entropy reaches a maximum value when the composition is near equi-atomic. In a non-limiting example, the high entropy alloy may comprise four or more principal elements, optionally five principal elements, having a mixing entropy ($\Delta S_{mix}$) of greater than 1.3R where R is a gas constant (8.314 J/K mole). Optionally, the high entropy alloy may comprise four or more principal elements, optionally five principal elements, having a $\Delta S_{mix}$ of greater than 1.5R. In a non-limiting example, the high entropy alloy may comprise four or more principal elements, optionally five principal elements, and the principal elements may each comprise from 5 to 90 atomic % of the high entropy alloy, and optionally the high entropy alloy may comprise at least four principal elements, optionally five principal elements, with each principal element present in an amount of from 5 to 35 atomic % of the high entropy alloy. Principal elements may include, but are not limited to, Fe, Co, Ni, Hf, Si, B, Cu, Al, Mg, W, Ta, Nb, Cr, Sn, Zr, Ti, Pd, Au, Pt, Ag, Ru, Mo, V, Re, Bi, Cd, Pb, Ge, Sb, Zn, and Mn. For example, the high entropy alloy may comprise two more of, optionally three or more of, optionally four or more of, optionally five or more of, optionally six or more of, and optionally seven of more of Al: 5-90 atomic %, Fe: 5-90 atomic %, Mn: 5-90 atomic %, Ni: 5-90 atomic %, Cr: 5-90 atomic %, Co: 5-90 atomic %, Cu: 5-90 atomic %, and Zn: 5-90 atomic %. Optionally, the high entropy alloy may further comprise one or more principal minor elements in an amount of less than 5 atomic %. In one illustrative example, the high entropy alloy comprises Zn as a principal minor element. Optionally, the high entropy alloy may comprise at least four or more principal elements wherein at least four of the principal elements each comprise from 5 to 35 atomic % of the high entropy alloy. In an illustrative example, the high entropy alloy comprises four or more of: Al: 5-35 atomic %, Fe: 5-35 atomic %, Mn: 5-35 atomic %, Ni: 5-35 atomic %, Cr: 5-35 atomic % Co: 5-90 atomic %, Cu: 5-90 atomic %, and Zn: 5-90 atomic %.

The principal elements of the high entropy alloy may be present in an equimolar amount, or in a near-equimolar amount. Optionally, at least four of the principal elements of the high entropy alloy may be present in an equimolar amount, or in a near-equimolar amount. In a non-limiting example, relative amounts of each (or optionally two, three, four, or five of the) principal element(s) in the high entropy alloy varies no more than 15 atomic %, no more than 10 atomic %, or no more than 5 atomic %. In an illustrative example, the high entropy alloy comprises at least four principal elements, the at least four principal elements of the high entropy alloy comprise at least 90 atomic % of the high entropy alloy, and the relative amounts of at least four principal elements of the high entropy alloy vary by no more than 5 atomic %, such as a high entropy alloy that comprises Al, Fe, Mn, Ni, Cr, Co, Cu, and/or Zn. For example, the high entropy alloy may comprise five principal elements and the relative amounts of each of the principal elements in the high entropy alloy varies no more than 5 atomic %, such as a high entropy alloy that comprises Al, Fe, Mn, Ni, Cr, Co, Cu, and/or Zn.

The high entropy alloy may consist only of principal elements except for impurities ordinarily associated with the principal elements or methods of making the high entropy alloy. Optionally, the high entropy alloy may contain one or more principal minor elements each comprising less than 5 atomic % of the high entropy alloy. Illustrative examples include Fe, Co, Ni, Hf, Si, B, Cu, Al, Mg, W, Ta, Nb, Cr, Sn, Zr, Ti, Pd, Au, Pt, Ag, Ru, Mo, V, Re, Bi, Cd, Pb, Ge, Sb, Mn, Zn, and mixtures thereof. In an illustrative example, the total amount of principal minor elements present in the high entropy alloy is less than or equal to 30 atomic %, optionally less than equal to 20 atomic %, optionally less than or equal to 10 atomic %, optionally less than 5 atomic %, optionally less than 2.5 atomic %, or optionally less than 1.0 atomic %.

The principal elements of the high entropy alloy may comprise at least 70 atomic % of the high entropy alloy, optionally at least 80 atomic % of the high entropy alloy, optionally at least 90 atomic % of the high entropy alloy, and optionally at least 95 atomic % of the high entropy alloy. In a non-limiting example, the principal elements of the high entropy alloy may comprise from 85 atomic % to 95 atomic % of the high entropy alloy.

The high entropy alloy can be formed by a variety of methods including, but not limited to, melting and casting, forging, or powder metallurgy. In a non-limiting example, the high entropy alloy may be produced by using liquid-phase methods include arc melting and induction melting, by using solid-state processing such as the use of a high-energy ball mill, gas-phase processing including sputtering, or by thermal spraying, laser cladding, or electrodeposition.

FIGS. 1-9B provide illustrative examples of multi-material components joined by the high entropy alloys of the present disclosure, methods of joining multi-material components with the high entropy alloys of the present disclosure, and welding consumables comprising the high entropy alloys or precursors of the high entropy alloys of the present disclosure.

As shown in FIG. 1, a multi-material component 5 may be provided that includes a first member 10 comprising a metal or a metal alloy including a base metal, a second member 20 comprising a metal or a metal alloy including a base metal, and a third member 30 joining the first member 10 to the second member 20. The metal or metal alloy of the first member 10 may be different than the metal or metal alloy of the second member 20, or the metal or metal alloy of the first member 10 may be the same as the metal or metal allot of the second member 20. In an illustrative example, the first member 10 comprises an aluminum alloy and the second member 20 comprises steel. In another illustrative example, both the first member 10 and the second member comprise steel. In another illustrative example, both the first member 10 and the second member 20 comprise iron. In another illustrative example, one of the first member 10 and the second member 20 comprises steel and the other of the first member 10 and the second member 20 comprises iron. It should be understood that either or both of the first member 10 and the second member 20 comprise a Zn coating as described herein. The third member 30 comprises the high entropy alloy and may be entirely or at least partially positioned between the first member 10 and the second member 20. The third member 30 may be in the form of a plate, a sheet, a foil, or the like, and the first member 10 and the second member 20 may be joined to the third member 30 by one or more welds, mechanical fasteners, adhesives, or any combination thereof. Optionally, the third member 30 may be in the form of a coating or cladding on one or both of the first member 10 and the second member 20. Accordingly, the third member 30 may be at least partially positioned between the first member 10 and the second member 20 to provide physical separation therebetween and function as an insulator to facilitate reduction of the galvanic potential between the first member 10 and the second member 20. In a non-limiting example, the first member 10 and the second member 20 are spot welded to the third member 30 with electrodes of a resistance spot welding device 40. In a non-limiting example, the third member 30 may be in the form of a sheet or a foil strip that has a thickness of from 0.10 mm to 1.0 mm, optionally from 0.15 mm to 0.6 mm, optionally from 0.25 mm to 0.5 mm, and optionally 0.4 mm. In another non-limiting example, the third member may have a thickness of between about 1 and 1000 μm, optionally between about 25 and 750 μm, optionally between about 50 and 500 μm, optionally between about 50 and 250 μm, and optionally between about 75 and 500 μm. Optionally, the third member consists only of the high entropy alloy.

It is to be understood that the third member 30 may be secured to the first member 10 or the second member 20 prior to the spot welding operation. In an illustrative example, the third member 30 is secured to the first member 10, the first member 10 is then positioned opposite the second member 20 with the third member 30 positioned between the first member 10 and the second member 20, followed by the spot welding operation that forms a weld nugget that extends through a portion of each of the first member 10, the second member 20, and the third member 30 to join or otherwise secure the first member 10 to the second member 20 to form the multi-material component 5. It is to be understood that the third member 30 may be secured to the first member 10 or the second member 20 using any suitable method. Illustrative examples include adhesives, mechanical fasteners, welds, and cladding of the third member 30 to one or both of the first member 10 and the second member 20.

Although FIG. 1 includes only a single third member 30 for joining the first member 10 to the second member 20, it is to be understood that any number of third members 30 may be positioned between the first member 10 and the second member 20 for the purposes of joining (such as by spot welding) the first member 10 to the second member 20. It is also to be understood that the third member 30 may comprise more than one high entropy alloy. In an illustrative example, the third member 30 may comprise a first high entropy alloy that is particularly suitable for joining (such as spot welding) to the first member 10 and a second high entropy alloy that is a different alloy than the first high entropy alloy and is particularly suitable for joining (such as spot welding) to the second member 20. In such a configuration, the third member 30 may comprise a laminate with the first high entropy alloy bonded (such as with an adhesive) to the second high entropy alloy. In another non-limiting example, the first high entropy alloy may be secured to the first member 10 (such as with an adhesive, weld, cladding, or mechanical fastener), the second high entropy alloy may be secured to the second member 20 (such as with an adhesive, weld, cladding, or mechanical fastener), the first member 10 may then be positioned with respect to the second member 20 with the first high entropy alloy positioned adjacent to the second high entropy alloy, and spot welding as shown in FIG. 1 may be performed to form a weld nugget that may include one or more portions of the first member 10, the first high entropy alloy, the second high entropy alloy, and the second member 20 to join the first member 10 to the second member 20.

It is to be understood that the first member 10 and the second member 20 are not limited to the examples described herein. In a non-limiting example, the first member 10 can be comprised of steel, aluminum and aluminum alloys, magnesium and magnesium alloys, and titanium and titanium alloys, and the second member 20 may be comprised of steel, aluminum and aluminum alloys, magnesium and magnesium alloys, and titanium and titanium alloys. Aluminum alloys include, but are not limited, to cast and wrought alloys. Illustrative examples of steel include advanced high-strength steels such as dual phase steels 980 grade, and ultra-high strength steels. It is also to be understood that the first member 10 and the second member 20 can be the same alloys, but different grades. In an illustrative example, the first member 10 may be a 7000 series aluminum alloy such as 7075, and the second member 20 may be a 6000 series aluminum alloy such as 6061. In another illustrative example, the first member 10 may be a first steel composition such as Usibor® 1500P (commercially available from Arcelor Mittal), and the second member 20 may be a second steel composition such as JAC980YL that is different than the first steel composition. It is also to be understood that either or both of the first member 10 and the second member 20 may be coated. For example, the first member 10 may be an ultra-high strength steel such as Usibor® 1500P (commercially available from Arcelor Mittal) with an Al—Si coating, the second member 20 may be an aluminum alloy such as 7075 or 6061, and optionally the third member 30 includes at least Fe, Al, and Si as principal elements, and optionally may comprise Fe, Al, Mn, Si, Cr, and Ni as principal elements and include B as a principal minor element. The composition of Usibor® 1500P is summarized below in weight percentages (the rest is iron (Fe) and unavoidable impurities):

| C | Mn | Si | Ni | Cr | Cu | S | P | Al | V | Ti | B |
|---|----|----|----|----|----|----|---|----|---|----|---|
| 0.221 | 1.29 | 0.28 | 0.013 | 0.193 | 0.01 | 0.001 | 0.018 | 0.032 | 0.005 | 0.039 | 0.0038 |

In a non-limiting example, the first member 10 may be a zinc-plated steel such as JAC980YL, the second member 20 may be an aluminum alloy such as 7075 or 6061, and the third member 30 optionally includes at least Fe, Al, and Si as principal elements, and optionally may comprise Fe, Al, Mn, Si, Cr, and Ni as principal elements and include B as principal a minor element. JAC980YL is a high-performance high-tensile steel defined according to the Japan Iron and Steel Federation Standard.

In another non-limiting example, both the first member 10 and the second member 20 may be a zinc-plated steel such as JAC980YL, and the third member 30 optionally includes at least one of Cu, Co, and Zn as a principal major element, and optionally may comprise at least one of Cu and Co as a principal major element and Zn as a principal minor element.

The high entropy alloy of the third member 30 may comprise a first principal element that is the same as the metal or the base metal of the first member 10, and optionally comprises a second principal element that is the same as the metal or the base metal of the second member 20. For example, the first member 10 may comprise an aluminum alloy, the second member 20 may comprise steel, and the high entropy alloy of the third member 30 may comprise at least Al and Fe as principal elements. In a non-limiting example, the first member 10 is a coated steel, the second member 20 is an aluminum alloy, and the high entropy alloy of the third member 30 includes Fe, Al, and a third element as a principal element that is included in the coating of the steel of the second member 20. In a non-limiting example, the coating includes Si and the high entropy alloy of the third member 30 includes Fe, Al, and Si as principal elements. In another non-limiting example, the coating includes Zn and the high entropy alloy of the third member 30 includes Fe, Al, and Zn as principal elements. Optionally, the high entropy alloy of the third member 30 includes five principal elements: Al, Fe, Mn, Cr, and Ni. Optionally, the high entropy alloy of the third member 30 includes six principal elements: Al, Fe, Mn, Si, Cr, and Ni.

In another non-limiting example, the first member 10 may be a coated iron and/or a coated steel, the second member 20 may be a coated iron and/or a coated steel that is the same or different from the coated iron and/or coated steel of the first member 10, and the third member 30 may comprise a high entropy alloy as described herein. In this example, the coating may be a Zn coating, wherein the Zn coating may optionally be provided by galvanizing the iron and/or steel to provide galvanized iron and/or galvanized steel, respectively, and/or by galvannealing the iron and/or steel to provide a galvannealed iron and/or galvannealed steel, respectively. It should be understood that in resistance spot welding processes of galvannealed iron and/or galvannealed steel without a third member as described herein, the low melting point of the Zn coating, as well as the applied load by the welding electrodes, may cause diffusion of Zn into the iron and/or steel, leading to LME cracking. By providing a third member 30 as described herein, the high entropy alloy may absorb free Zn during welding and thus prevent Zn from segregating into the weld zone of the first and second members. In this way, high joint quality may be achieved.

In another non-limiting example, the high entropy alloy of the third member 30 may comprise a first principal element that is the same as the base metal of the first member 10, a second principal element that is the same as a second or a third most abundant element of the first member 10, a third principal element that is the same as the base metal of the second member 20, a fourth principal element that is the same as a second or a third most abundant element of the second member 20, and/or a fifth principal element that is the same as a coating of the first member 10 and/or the second member 20. For example, the first member 10 may be a 6061 aluminum alloy that contains Mg and Si as the second and third most abundant elements, the second member 20 may be JAC980YL zinc-coated steel that contains Mn and Cr as the second and third most abundant elements, and the third member 30 includes Al, Fe, Si, and Mn, optionally the third member 30 includes Al, Fe, Si, and Cr, and optionally the third member includes Al, Fe, Si, Mn, and Cr. In another example, the first member 10 and the second member 20 may be JAC980YL zinc-coated steel that contains Mn and Cr as the second and third most abundant elements, and the third member 30 includes Fe. In this example, the third member may also optionally comprise Mn, Ni, Co, Cu, Cr, and/or Zn, as described herein.

Figure 2:
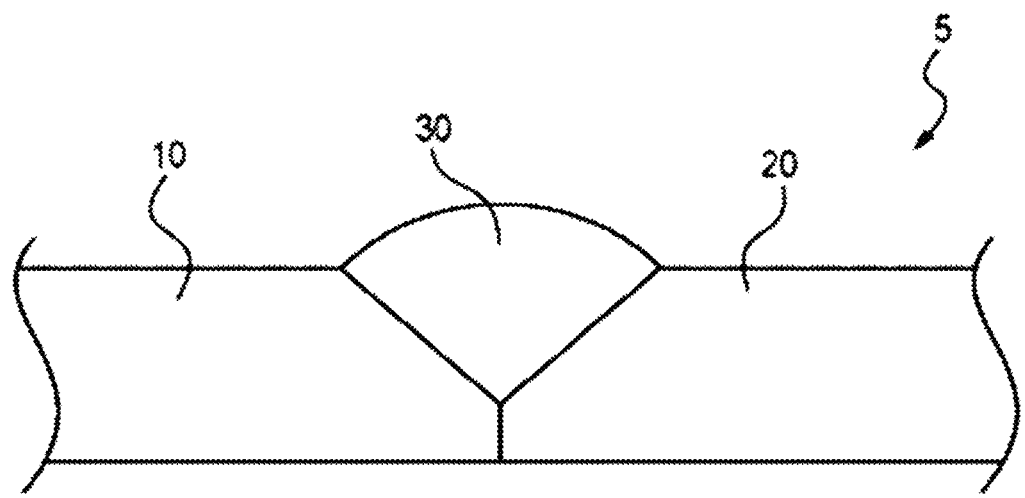
FIG. 2 illustrates a cross-sectional view of an exemplary multi-material component according to one aspect of the present disclosure.

As shown in FIG. 2, the third member 30 comprising the high entropy alloy may be deposited on the first member 10 and the second member 20 to form the multi-material component 5. The third member 30 may be deposited on the first member 10 and the second member 20 without melting the first member 10 or the second member 20. As shown in FIGS. 3A and 3B, the high entropy alloy (or a high entropy alloy precursor composition) may be provided in the form of a welding consumable 140, and a heat source may be applied to the welding consumable 140 to deposit the third member 30 comprising the high entropy alloy on the first member 10 and the second member 20. It is to be understood, however, that a portion of one or both of the first member 10 and the second member 20 may be melted at the location where the third member 30 is deposited. Non-limiting examples of methods that may be used to deposit the third member 30 comprising the high entropy alloy on the first member 10 and the second member 20 include at least one of electron beam welding, laser beam welding (FIG. 4), plasma arc welding, gas metal arc welding (FIG. 5), gas tungsten arc welding (FIG. 6), laser cladding (FIGS. 7A and 7B), flux cored arc welding, and submerged arc welding.

The high entropy alloy (or high entropy alloy precursor composition) of the welding consumable 140 may include any composition described above for use with any of the first member 10 and second member 20 combinations described above. In an illustrative example, the welding consumable 140 may comprise a first principal element that is the same as the metal or the base metal of the first member 10, and optionally comprises a second principal element that is the same as the metal or the base metal of the second member 20. For example, the first member 10 comprises an aluminum alloy, the second member 20 comprises steel, and the high entropy alloy (or high entropy alloy precursor composition) of the welding consumable 140 comprises at least Al and Fe as principal elements. In another example, the first member 10 and/or the second member 20 may each comprise Fe or steel, and the high entropy alloy (or high entropy alloy precursor composition) of the welding consumable 140 comprises at least Fe as a principal element. In another example, the first member 10 and/or the second member 20 may each comprise galvannealed Fe and/or galvannealed steel, and the high entropy alloy (or high entropy alloy precursor composition) of the welding consumable 140 comprises at least Fe as a principal element and optionally Zn as a principal major element or a principal minor element. In another example, the first member 10 and/or the second member 20 may each comprise Fe and/or steel, each independently with or without a Zn coating as described herein, and the high entropy alloy (or high entropy alloy precursor composition) of the welding consumable 140 comprises at least one of Cu, Co, and Zn as a principal major element, and optionally at least one of Cu and Cu as a principal major element and Zn as a principal major element or a principal minor element. Optionally, the high entropy alloy (or high entropy alloy precursor composition) of the welding consumable 140 includes five principal elements:

Al, Fe, Mn, Cr, and Ni. Optionally, the high entropy alloy (or high entropy alloy precursor composition) of the welding consumable 140 includes four or more principal elements, optionally five or more principal elements, optionally six or more principal elements, and optionally seven or more principal elements, wherein the principal elements are selected from the group consisting of Fe, Mn, Ni, Co, Cu, Cr, and Zn. Optionally, the high entropy alloy (or high entropy alloy precursor composition) of the welding consumable 140 includes one principal minor element as described herein.

As shown in FIGS. 3A and 3B, the welding consumable 140 may be a filler wire including a base filler material 141 comprising the high entropy alloy or a high entropy alloy precursor composition that forms a high entropy alloy when melted. A shield or flux 142 may be provided around the core base filler material 141. Alternatively, the flux 142 may be disposed in the core of the filler wire (not shown). Flux 142 is used to protect the weld area from oxidation. For example, the flux 142 may form a protective slag over the weld area to shield the weld area from the atmosphere and/or form carbon dioxide to protect the weld area. Such a flux coating is generally known and often used with self-shielding electrodes. Although the welding consumable 140 is primarily described herein with respect to a filler wire, the welding consumable 140 is not limited to such configuration and may take any suitable form including, but not limited to, foil, strip, plate, or powder forms. It is also to be understood that the welding consumable 140 may be made by any method used to make welding consumables or to form high entropy alloys. In a non-limiting example, the welding consumable 140 may be produced by using liquid-phase methods include arc melting and induction melting, by using solid-state processing such as the use of a high-energy ball mill, gas-phase processing including sputtering, or by thermal spraying, laser cladding, or electrodeposition. In a non-limiting example, the welding consumable may be a filler wire having a diameter of 0.8 mm to 5.0 mm, optionally 0.8 mm to 1.75 mm, optionally 1.50 mm to 2.5 mm, optionally 4.50 mm to 5.00 mm, optionally 1.0 mm, optionally 1.2 mm, optionally, 1.6 mm, optionally 2.0 mm, optionally 2.4 mm, and optionally 4.76 mm.

Figure 5:
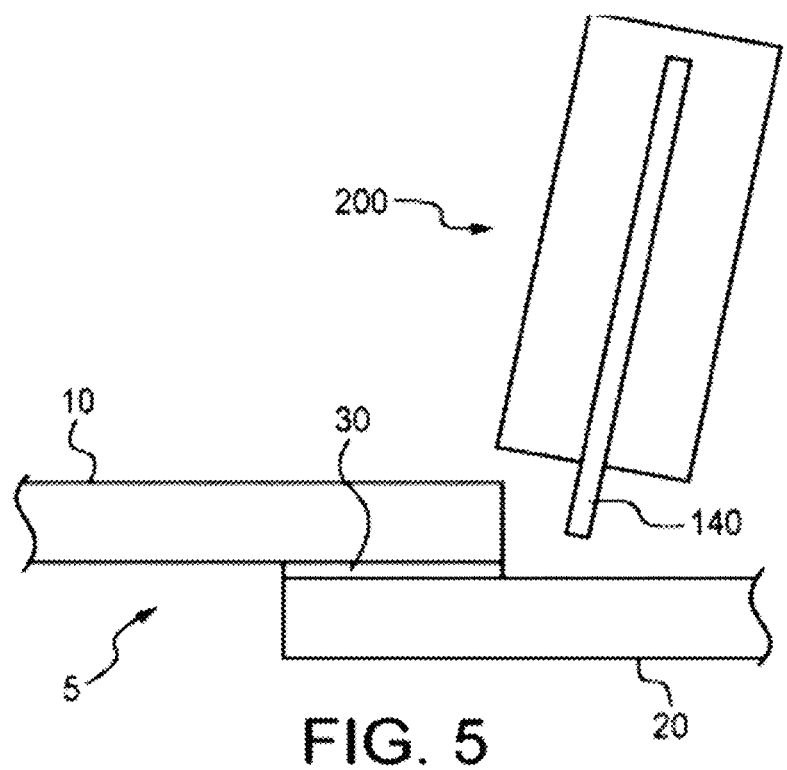
FIG. 5 illustrates a diagram of a gas metal arc welding system for brazing, cladding, building up, filling, hard-facing, overlaying, welding, and joining applications with a high entropy alloy according to one aspect of the present disclosure.
Figure 6:
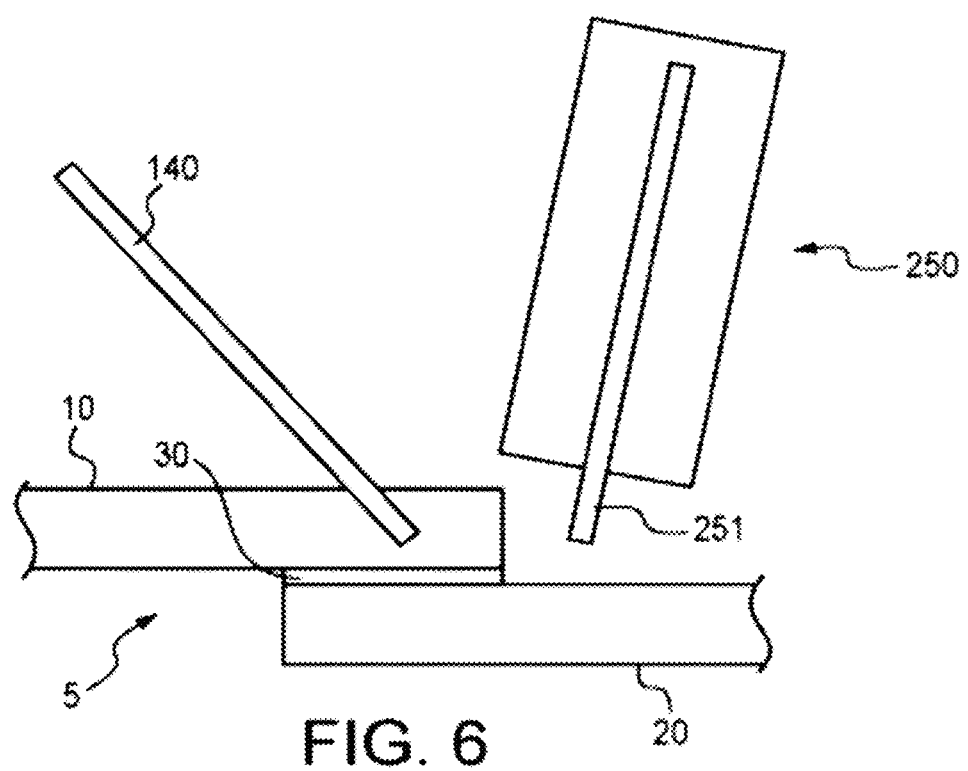
FIG. 6 illustrates a diagram of a gas tungsten arc welding system for brazing, cladding, building up, filling, hard-facing, overlaying, welding, and joining applications with a high entropy alloy according to one aspect of the present disclosure.

As shown in FIG. 4, a laser beam 110 may be applied from an energy source to melt the welding consumable 140 to join the first member 10 to the second member 20 with the high entropy alloy. As shown in FIG. 5, a metal inert gas welding device 200 is provided that is capable of melting the welding consumable 140 to join the first member 10 to the second member 20 with the third member 30 comprising the high entropy alloy. As shown in FIG. 6, a tungsten inert gas welding device 250 is provided with a non-consumable electrode 251 capable of melting the welding consumable 140 to join the first member 10 to the second member 20 with the third member 30 comprising the high entropy alloy.

Figure 7A:
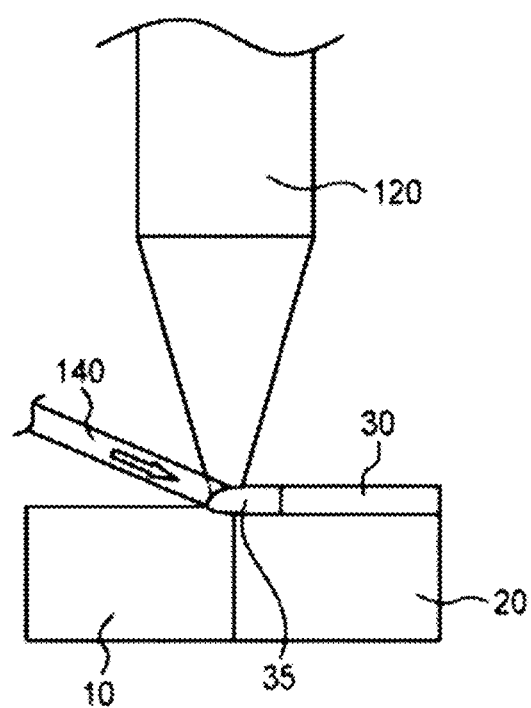
FIG. 7A illustrates a laser cladding system that uses a wire welding consumable for depositing a high entropy alloy on a substrate.
Figure 7B:
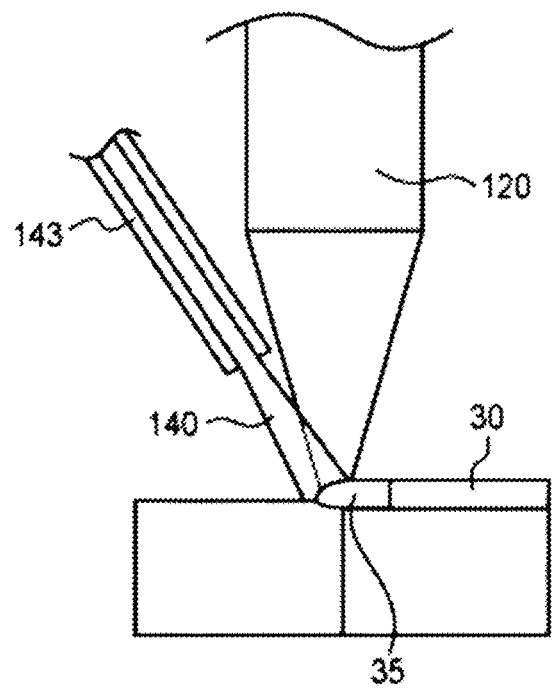
FIG. 7B illustrates a laser cladding system that uses a powder welding consumable for depositing a high entropy alloy on a substrate.

As shown in FIGS. 7A and 7B, the third member 30 may be applied to the first member 10 and the second member 20 as a cladding or weld overlay. As shown in FIG. 7A, a laser 120 may be provided for applying a laser beam to the welding consumable 140 (in the form of a wire) to form a melt pool 35 of the high entropy alloy that solidifies to form the third member 30 to join the first member 10 to the second member 20. As shown in FIG. 7B, the laser 120 may apply a laser beam to the welding consumable 140 that is in the form of a powder. The powder welding consumable 140 is fed via an injection nozzle 143 to the laser 120 where a laser beam contacts the powder welding consumable 140 to form a melt pool 35 of the high entropy alloy that solidifies to form the third member 30. It is to be understood that the powder welding consumable 140 may be a powder form of the high entropy alloy, or may be a mixture of metal or metal alloy powders that are melted by the laser 120 to form the high entropy alloy. Although the cladding or overlaying of the third member 30 is described with respect to a laser 120, it is to be understood that the cladding or overlaying of the third member 30 can be applied using any suitable process including, but not limited to, manual metal arc welding, gas tungsten arc welding, gas metal arc welding, submerged arc welding, flux cored arc welding, and plasma transferred arc welding.

Figure 8:
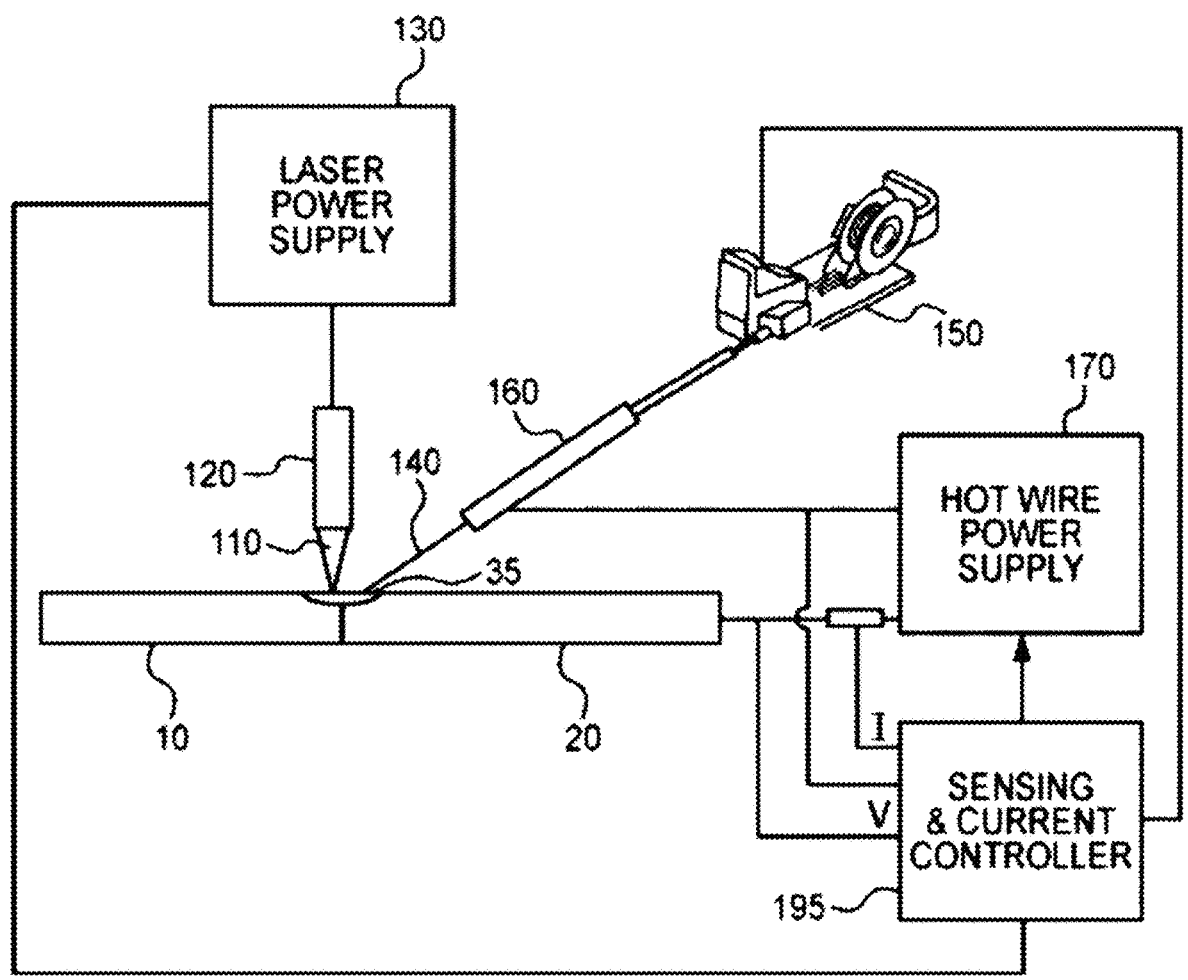
FIG. 8 illustrates a functional schematic block diagram of a combination wire welding consumable feeder and energy source system for any of brazing, cladding, building up, filling, hard-facing, overlaying, welding, and joining applications with a high entropy alloy according to one aspect of the present disclosure.

As shown in FIG. 8, a high energy heat source may be provided for performing any of brazing, cladding, building up, filling, hard-facing overlaying, and joining/welding applications with the welding consumable 140. The high energy heat source is capable of heating one of the first member 10, the second member 20, the welding consumable 140, or any combination thereof to form the melt pool 35. The high energy heat source can be a laser subsystem 130/120 that includes a laser device 120 and a laser power supply 130 operatively connected to each other. The laser 120 is capable of focusing a laser beam 110 onto one of the first member 10, the second member 20, and the welding consumable 140, or any combination thereof, and the power supply 130 provides the power to operate the laser device 120. The laser subsystem 130/120 can be any type of high energy laser source, including but not limited to carbon dioxide, Nd:YAG, Yb-disk, YB-fiber, fiber delivered, or direct diode laser systems. Further, white light or quartz laser type systems can be used if they have sufficient energy. Although the high energy heat source is described with respect to a laser system, it is to be understood that this reference is exemplary and any high intensity energy source may be used. Other non-limiting examples of the high energy heat source may include at least one of an electron beam, a plasma arc welding subsystem, a gas tungsten arc welding subsystem, a gas metal arc welding subsystem, a flux cored arc welding subsystem, and a submerged arc welding subsystem.

A filler wire feeder subsystem may be provided that is capable of providing at least one welding consumable 140 to the vicinity of the laser beam 110. It is understood that the molten puddle, i.e., melt pool 35, may be considered only part of the high entropy alloy from the welding consumable 140, or part of one or both of the first member 10 and the second member 20 with the high entropy alloy from the welding consumable 140. The filler wire feeder subsystem may include a filler wire feeder 150, a contact tube 160, and a wire power supply 170. The wire welding power supply 170 may be a direct current (DC) power supply (that can be pulsed, for example), although alternating current (AC) or other types of power supplies are possible as well. The wire welding consumable 140 is fed from the filler wire feeder 150 through the contact tube 160 toward the first member 10 and/or the second member 20 and extends beyond the tube 160. During operation, the extension portion of the wire welding consumable 140 may be resistance-heated by an electrical current from the wire welding power supply 170, which may be operatively connected between the contact tube 160 and the one or both of the first member 10 and the second member 20.

Prior to its entry into the weld puddle 35, the extension portion of the wire welding consumable 140 may be resistance-heated such that the extension portion approaches or reaches the melting point before contacting the weld puddle 35. Because the wire welding consumable 140 is heated to at or near its melting point, its presence in the weld puddle 35 will not appreciably cool or solidify the melt pool 35 and the wire welding consumable 140 is quickly consumed into the melt pool 35. The laser beam 110 (or other energy source) may serve to melt some of one or both of the first member 10 and the second member 20 to form the weld puddle 35. Optionally, the laser beam 110 (or other energy source) may serve to melt only the wire welding consumable 140 to form the weld puddle 35. The system may also include a sensing and control unit 195. The sensing and control unit 195 can be operatively connected to the power supply 170, the wire feeder 150, and/or the laser power supply 130 to control the welding process.

In a non-limiting example, the multi-material component 5 is an automotive component. In an illustrative example, the first member 10 is an aluminum alloy roof and the second member 20 is a steel vehicle body. In another illustrative example, the multi-material component 5 is any automotive component fabricated by joining the first member 10 and the second member 20 as described herein, wherein one or both of the first and second members comprise iron and/or steel having a Zn coating as described herein and are joined via resistance spot welding.

Figure 9A:
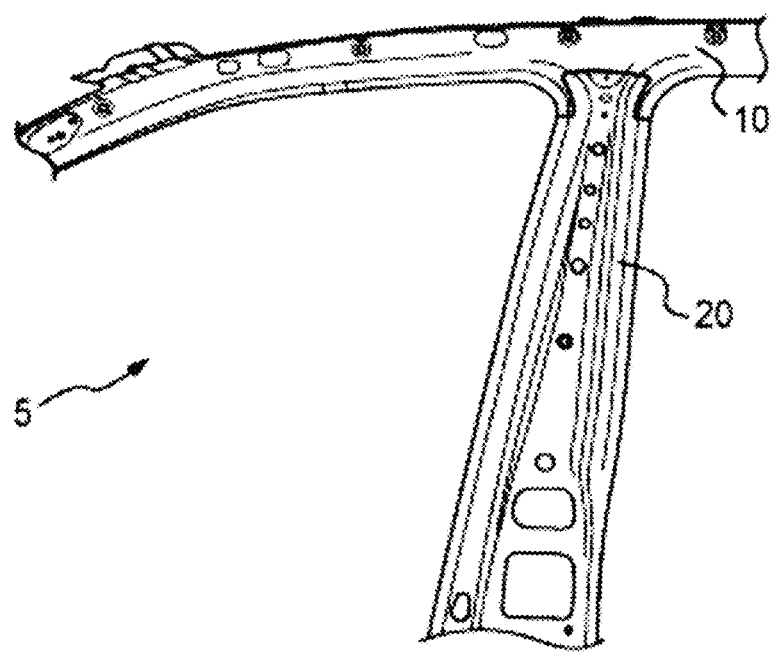
FIGS. 9A and 9B illustrate a B-pillar of a vehicle secured to a roof rail of the vehicle.
Figure 9B:
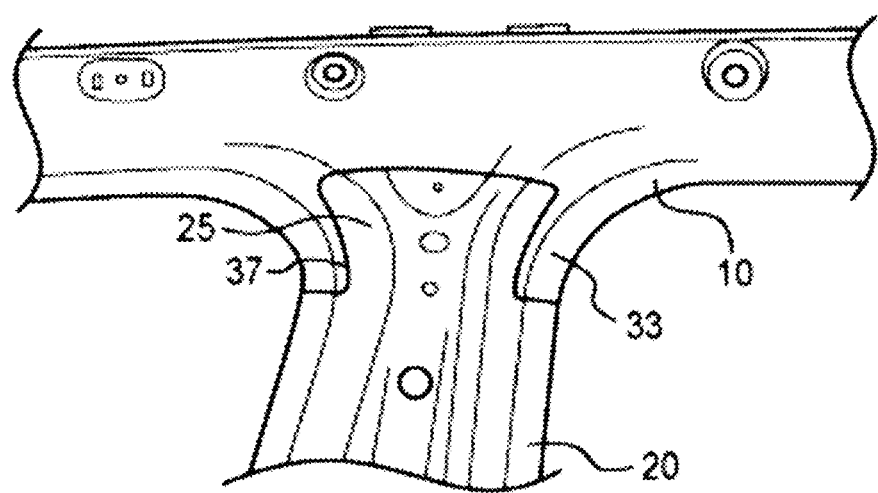

In a non-limiting example as shown in FIGS. 9A and 9B, the multi-material component 5 may include a first member 10 that is an aluminum alloy roof rail and a second member 20 that is a steel B-pillar. The first member 10 may be secured to the second member 20 with the third component 30 comprising the high entropy alloy using any of the methods disclosed herein. As shown in FIGS. 9A and 9B, a first end 25 of the second member 20 may overlap a portion 33 of the first member 10 that extends downwardly toward a side sill (not shown) that may be comprised of either an aluminum alloy or steel. An edge 37 of the first end 25 of the second member 20 may be welded to the first member 10 with the welding consumable 140 to deposit the third member 30 comprising the high entropy alloy on the first member 10 and the second member 20. In addition to, or alternatively, the third member 30 may be in the form of a plate, a sheet, or the like, and the first member 10 and the second member 20 may be joined to the third member 30 by one or more welds, mechanical fasteners, adhesives, or any combination thereof. In a non-limiting example, the third member 30 is a sheet that is positioned between the first end 25 of the second member 20 and the portion 33 of the first member 10, and the first member 10 and the second member 20 are then spot welded to the third member 30 with a resistance spot welding device 40.

While, for purposes of simplicity of explanation, the methods have steps described as executing serially, it is to be understood and appreciated that the present disclosure is not limited by the illustrated order, and some steps could occur in different orders and/or concurrently with other steps from that shown and described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

EXAMPLES

Figure 10:
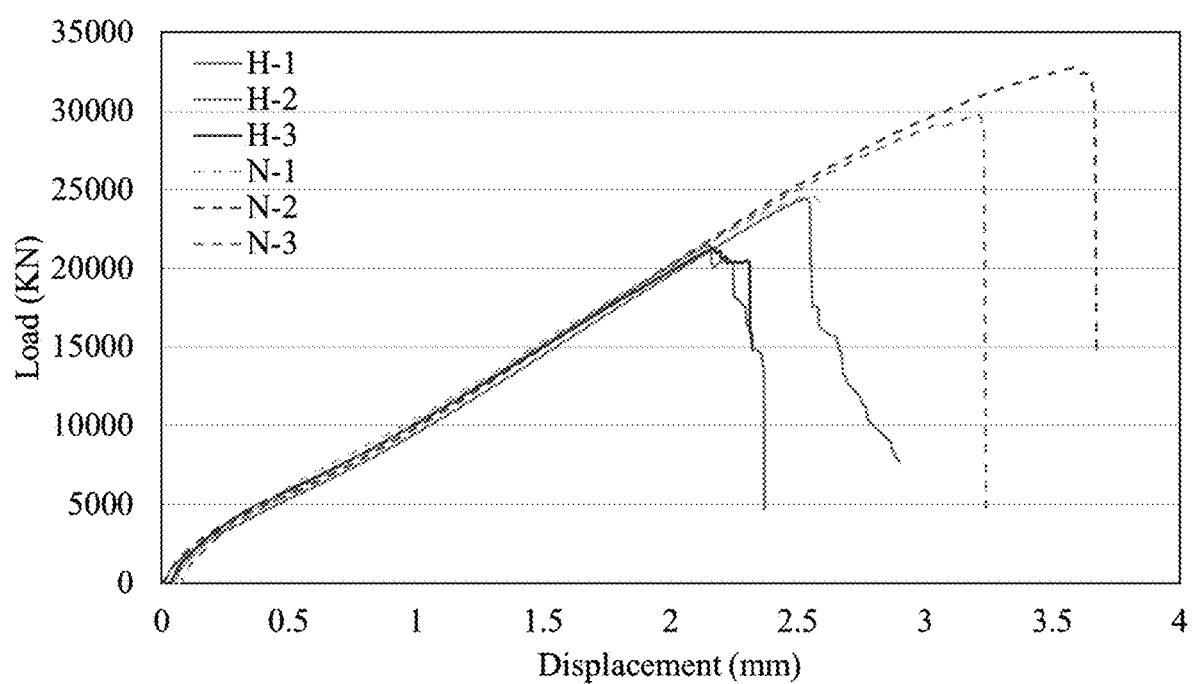
FIG. 10 shows the load (KN) vs. displacement (mm) for each sample studied in the Tensile-Sear Test described in Example I.

Example I: Tensile-Shear Test for Resistance Spot Welding Using 370 μm Thick HEA Interlayers A high entropy alloy consisting of Fe, Mn, Ni, and Co was prepared using vacuum arc melting. Multiple high entropy alloy foils each having a thickness of 370 μm were prepared by rolling then ground to a final thickness. Six weld sets were then formed by welding two of the galvannealed steel sheets via resistance spot welding within the following parameters: 60 Hz, 8.5 K. amps, 26 cycles, and 770 pounds. Weld sets N-1, N-2, and N-3 were formed without a high entropy alloy, and weld sets H-1, H-2, and H-3 were formed with the high entropy alloy provided as an interlayer between the two galvannealed steel sheets prior to welding. FIG. 10 shows the load (KN) vs. displacement (mm) for each sample studied in the Tensile-Sear Test described in Example I.

Figure 11:
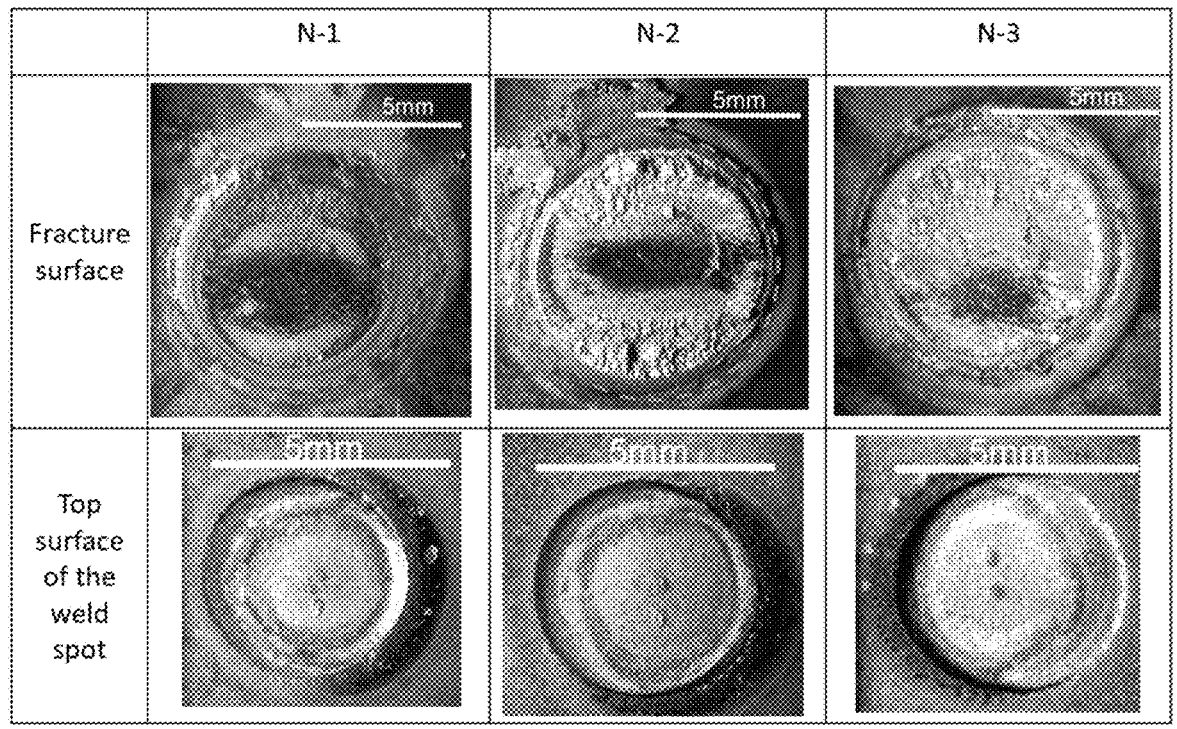
FIG. 11 shows the optical macrographs of the fracture surface and top surface of the weld spots of the upper steel sheet of samples N-1, N-2, and N-3, as described in Example II.
Figure 12A:
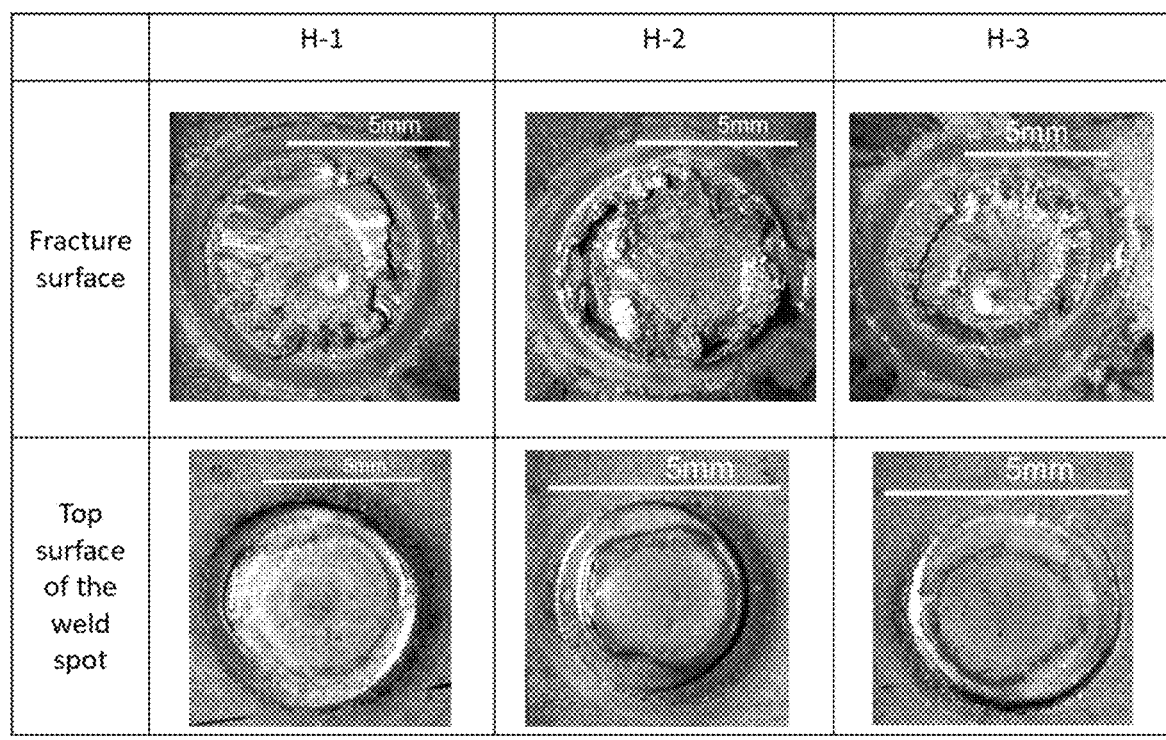
FIG. 12A shows the optical macrographs of the fracture surface and top surface of the weld spots of the upper steel sheet of samples H-1, H-2, and H-3, as described in Example II.
Figure 12B:
FIG. 12B shows a magnified portion of the top surface of the weld spot of sample H-2 in FIG. 12A.
Figure 13:
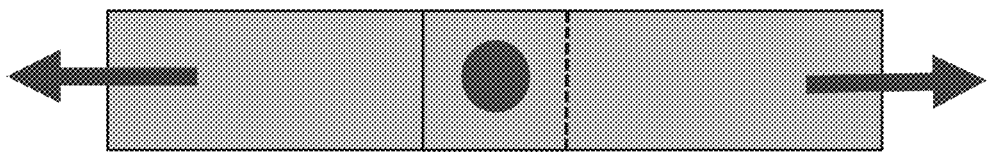
FIG. 13 is a schematic showing the tensile stress axis relative to the demonstrated plan views shown in FIGS. 11, 12, 15, and 16.

Example II: Fracture Surface of Spot Welds Using 370 μm Thick HEA Interlayers after Tensile-Shear Test FIG. 11 shows the optical macrographs of the fracture surface and top surface of the weld spots of the upper steel sheet of samples N-1, N-2, and N-3. Interfacial shear mode was detected in each of the samples. FIG. 12A shows the optical macrographs of the fracture surface and top surface of the weld spots of the upper steel sheet of samples H-1, H-2, and H-3. FIG. 12B is a magnified portion of the top surface of the weld spot of sample H-2. A mixed fracture mode (pull out+ interfacial shear) was detected in each of the samples. FIG. 13 is a schematic showing the tensile stress axis relative to the demonstrated plan views shown in FIGS. 11 and 12.

Based on Examples I and II, it was concluded that introducing the high entropy alloy interlayer resulted in a smaller spot weld area and partially (50%) pull out fracture mode instead of 100% interfacial fracture mode as observed in the samples without a high entropy alloy.

Figure 14A:
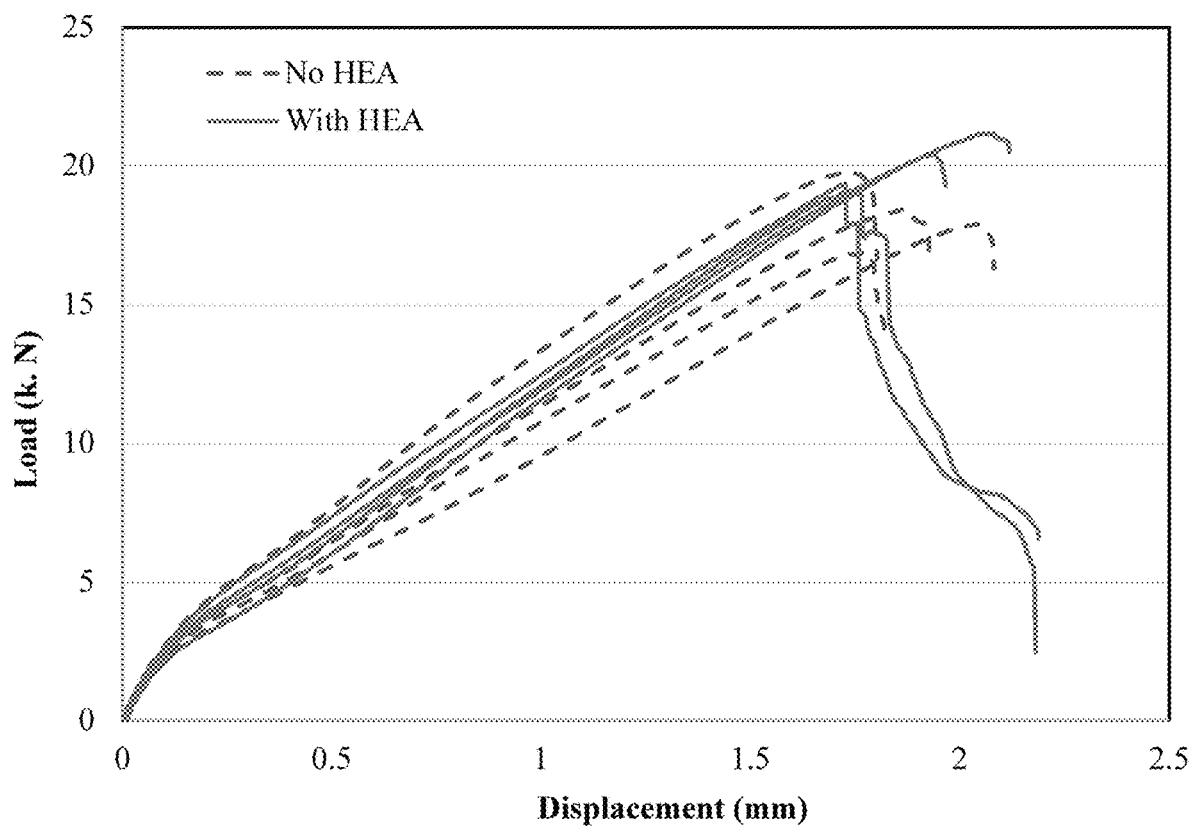
FIG. 14A shows the load (k. N) vs. displacement (mm) for each sample studied in the Tensile-Sear Test described in Example III
Figure 14B:
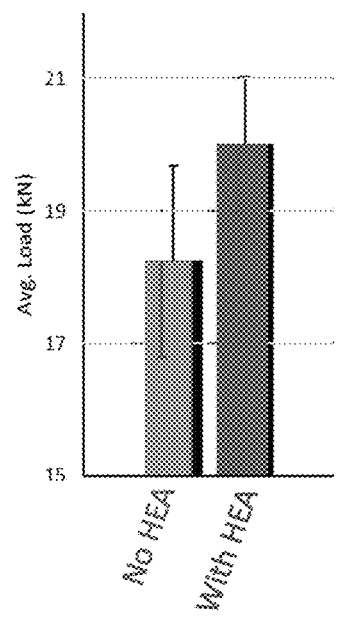
FIG. 14B shows the average fracture load for the two sets of samples with and without HEA interlayer.

Example III: Tensile-Shear Test for Resistance Spot Welding Using 220 μm Thick HEA Interlayers A high entropy alloy consisting of Fe, Mn, Ni, and Co was prepared using vacuum arc melting. Multiple high entropy alloy foils each having a thickness of 220 μm were prepared by rolling then ground to a final thickness. Eight weld sets were then formed by welding two of the steel sheets via resistance spot welding within the following parameters: 60 Hz, 9.5 K amps, 26 cycles, and 1000 pounds. Four weld sets were formed without a high entropy alloy interlayer, and four weld sets were formed with the high entropy alloy foil provided as an interlayer between the two steel sheets prior to welding. FIG. 14A shows the load (k. N) vs. displacement (mm) for each sample studied in the Tensile-Sear Test described in Example III. FIG. 14B shows the average fracture load for both of sample groups. From FIGS. 14A and 14B, it can be observed that by decreasing the thickness of the HEA interlayer down to 220 μm the average fracture load for samples with HEA interlayer increased by 10% more than that of the other samples without interlayers. This could be attributed to decreasing the stress concentration between the two welded steel sheets by using thinner interlayers. Also, there is more consistency in the tensile properties (strain hardening) with using the HEA interlayers as shown by the closer red curves in FIG. 14A and slightly narrower fluctuation in FIG. 14B.

Figure 15:
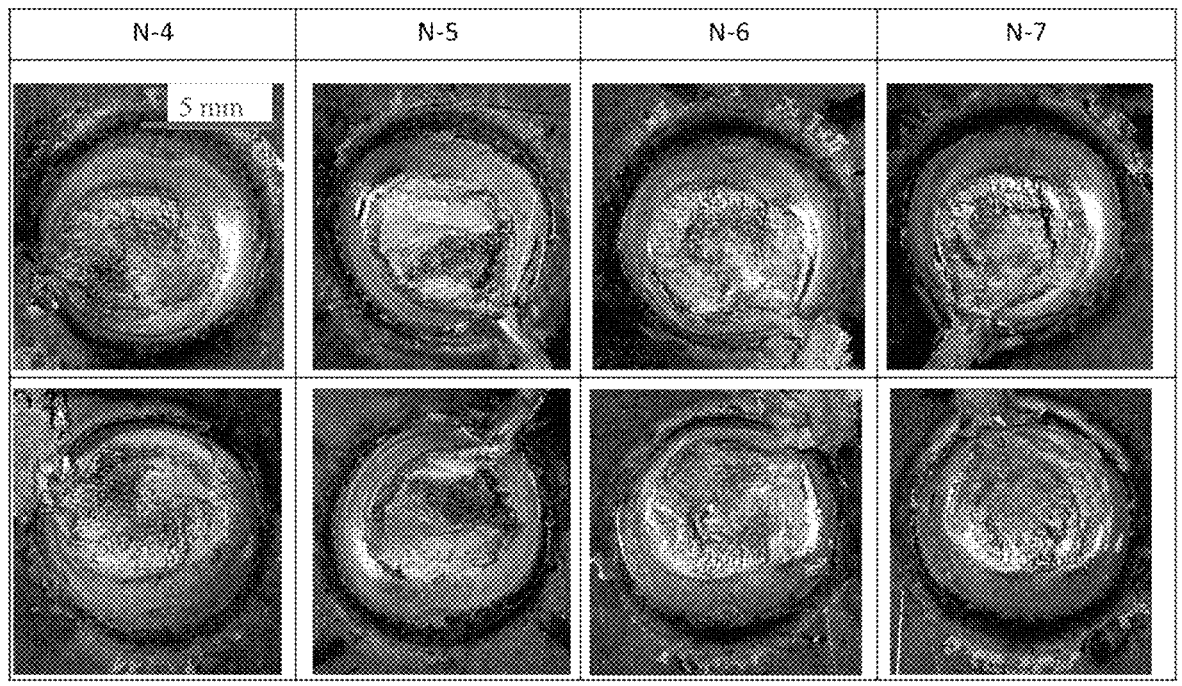
FIG. 15 shows the two fracture surfaces of the four samples without HEA interlayer as described in Example III.
Figure 16:
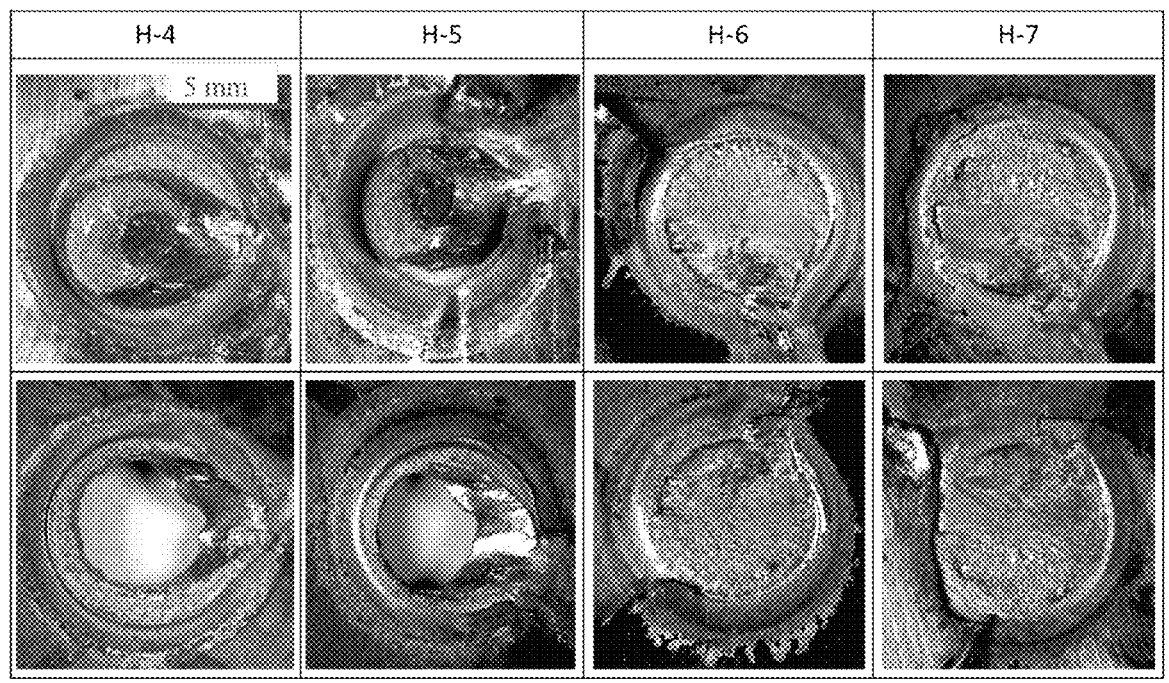
FIG. 16 shows the two fracture surfaces of the four samples with HEA interlayer as described in Example III.

Example IV: Fracture Surface of Spot Welds Using 220 μm Thick HEA Interlayers after Tensile-Shear Test FIG. 15 shows the optical macrographs of the two fracture surfaces (mirror images) of the spot welds for upper and lower steel sheets of samples N-4, N-5, N-6, and N-7. As observed before, fully interfacial shear fracture mode was seen in all samples. FIG. 16 shows of the two fracture surfaces (mirror images) of the spot welds for upper and lower steel sheets of samples H-4, H-5, H-6, and H-7. For this samples group, two samples (H-4 and H-5) failed by 100% pull out fracture mode while the other two samples failed majorly by interfacial shear mode. FIG. 13 is a schematic showing the tensile stress axis relative to the demonstrated plan views shown in FIGS. 15, and 16.

Based on Examples III and IV, it was determined that the samples containing the high entropy alloy interlayer showed higher fracture load as well as a more consistent tensile curve compared to the samples without the high entropy alloy interlayer.

Figure 17:
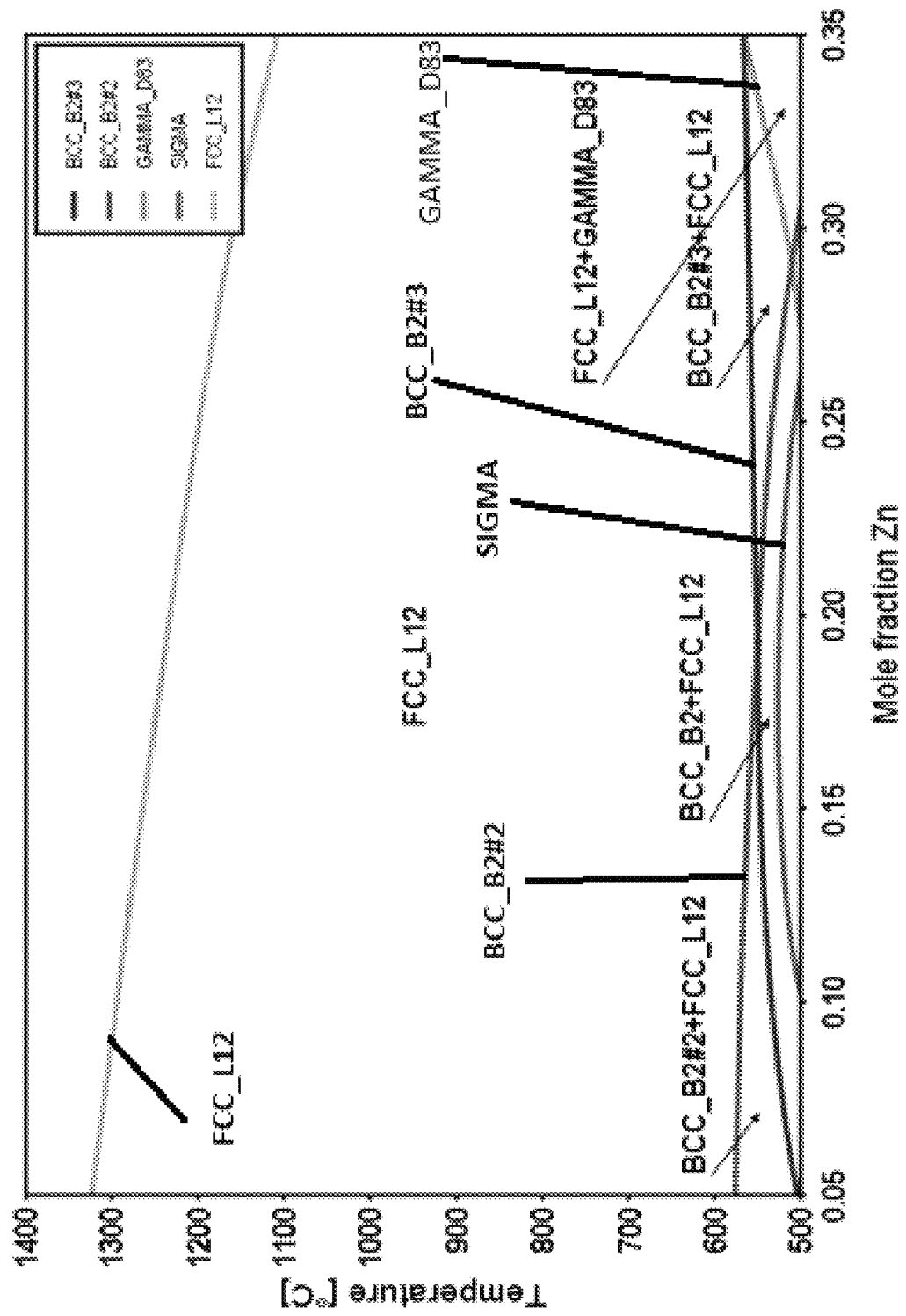
FIG. 17 shows a phase diagram as described in Example V.
Figure 18:
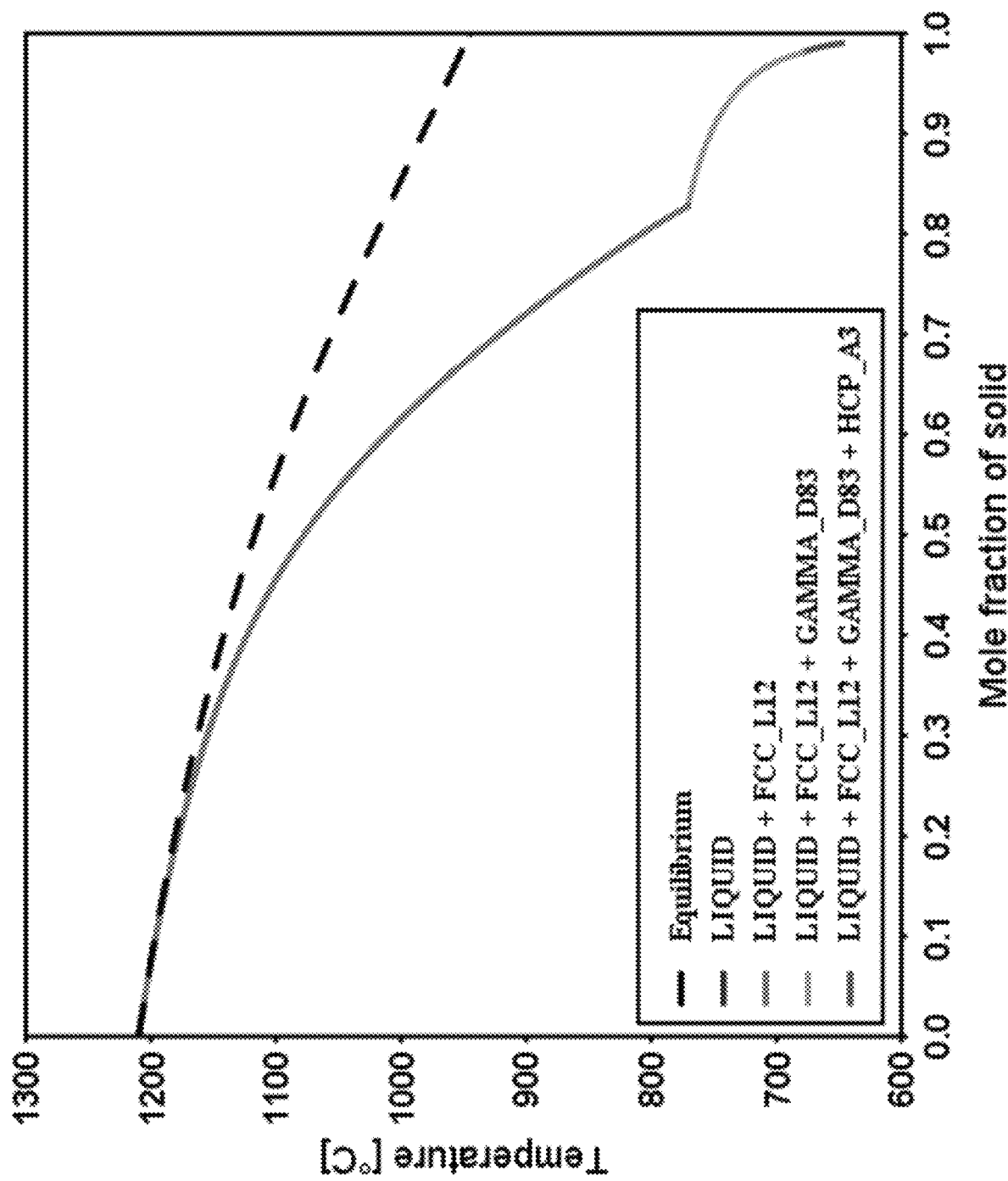
FIG. 18 shows a Scheil solidification diagram as described in Example V.

Example V: ThermoCalc Simulation of Equilibrium Phase and Scheil Solidification Diagrams ThermoCalc was used to prepare an equilibrium phase diagram and a Scheil solidification diagram for an example HEA consisting of Fe, Mn, Ni, Co, and Zn. FIG. 17 shows the phase diagram, and FIG. 18 shows the Scheil solidification diagram.

Figure 19:
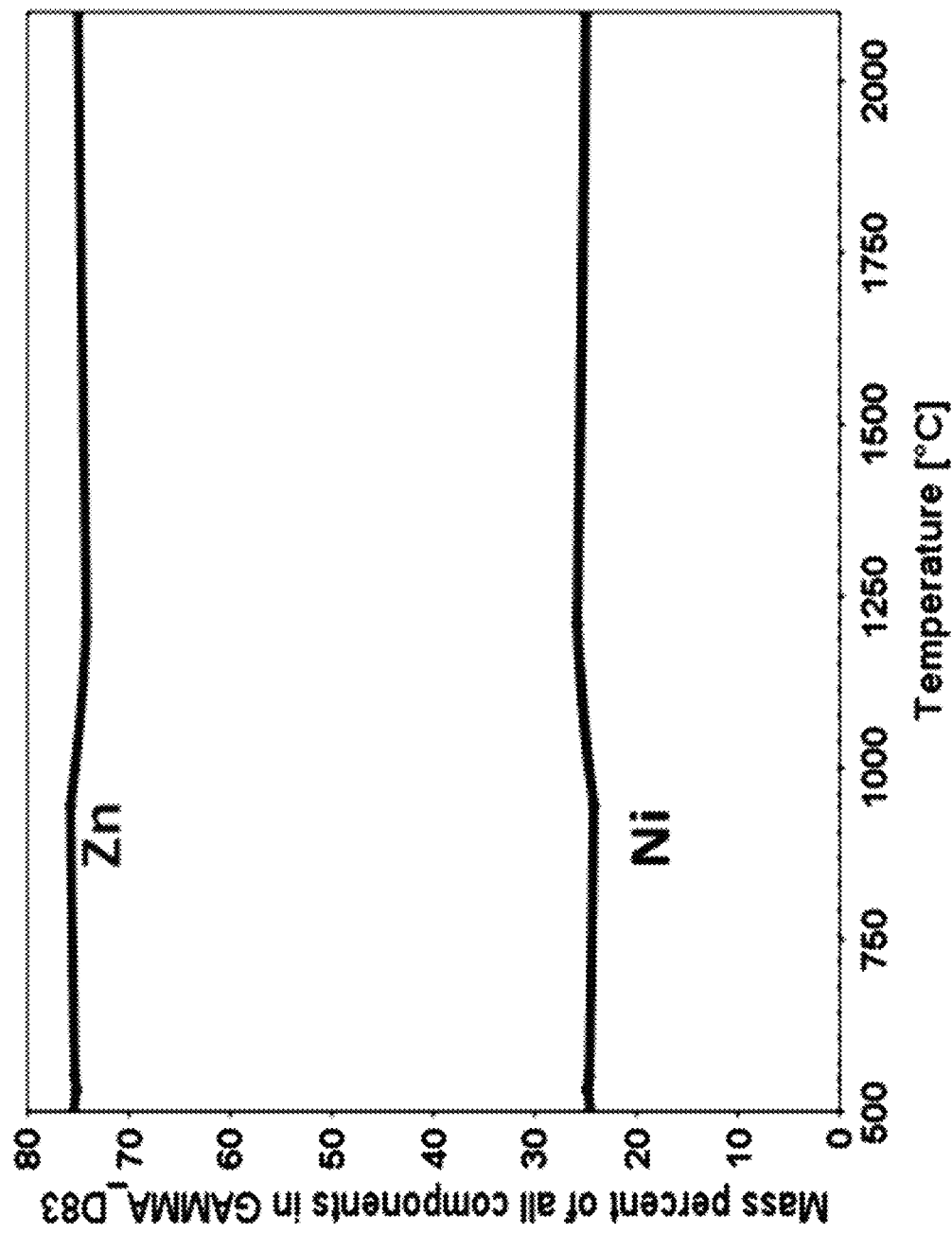
FIG. 19 shows the chemical composition of gamma phase as described in Example V.

As seen in FIG. 17, the phase diagram showed the dominance of the FCC phase. As seen in FIG. 18, the Scheil solidification diagram quantified the mole fraction of liquid and FCC phase to be more than 0.8. The calculation also predicted the presence of gamma phase in accordance with the equilibrium phase diagram. The composition of gamma phase was calculated to be 25 wt. % Ni-75 wt. % Zn, as shown in FIG. 19. (FIG. 19 shows the chemical composition of gamma phase.) Among the five known phases for zinc-nickel alloys stated in the literature, most of these alloys are utilized in the application of corrosion resistance plating η-(1 wt. % Ni), α, and β-(30 wt. % Ni, known as the nickel rich phase), which is the closest composition to what was calculated. Based on the plating application, they were not expected to be too brittle phases that cause a loss in toughness. β-(Ni3Zn22) 11 wt. % Ni and γ-(Ni5Zn21) 17.6 wt. % Ni are the other two phases considered to be Zn-rich.

Example VI: DICTRA Diffusion Modeling of HEA

Figure 20A:
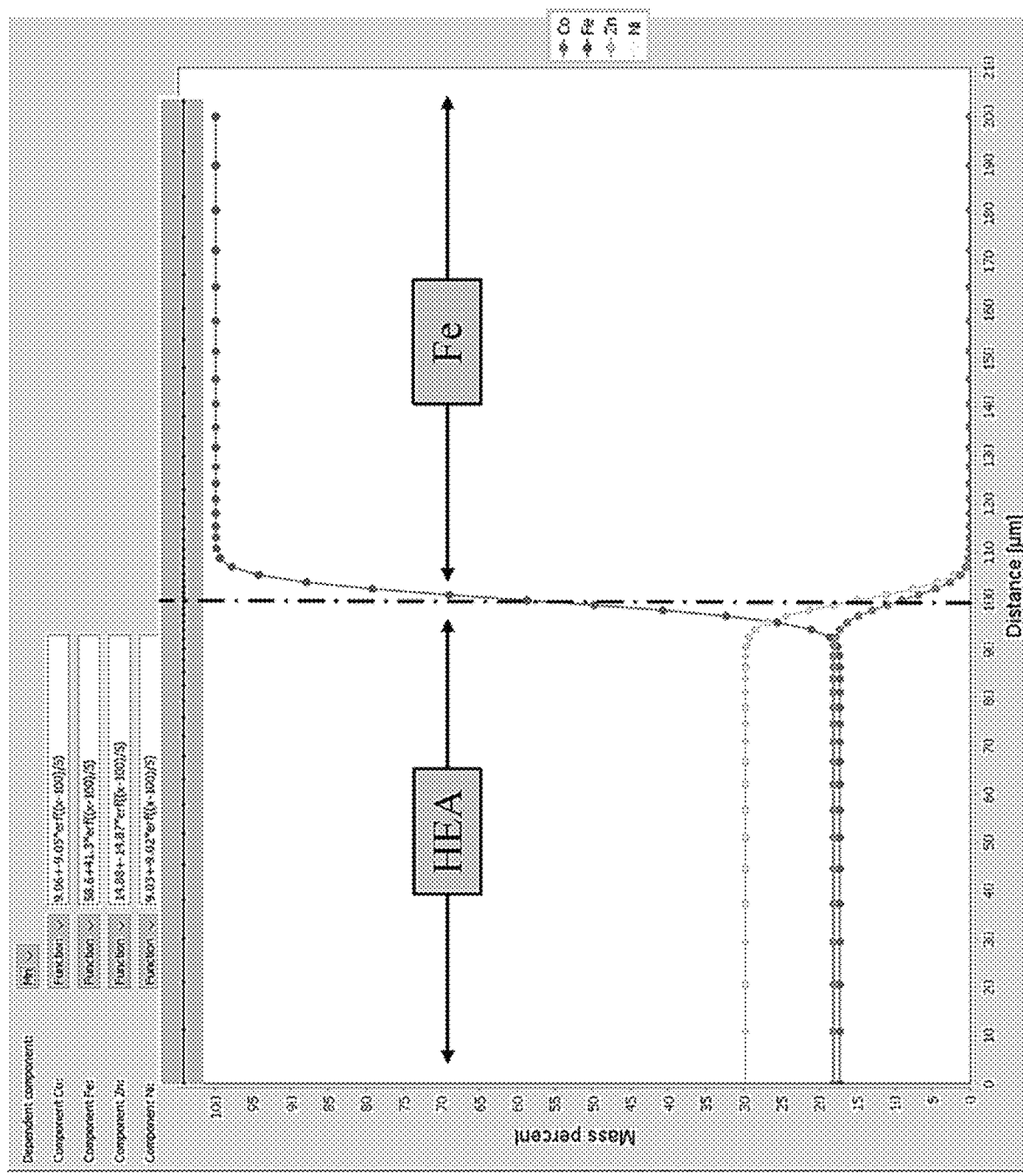
FIG. 20A shows the initial chemical composition profile as described in Example VI.

DICTRA, a module in the ThermoCalc software package for the simulation of diffusion controlled transformations in multicomponent systems, was used to model an example HEA consisting of Fe, Mn, Ni, Co, and Zn. The HEA database package TCHEA3 and MOBHEA1 were used under the assumption that there were two components, the HEA on the left side and steel on the right, and that the calculated amount of Zn from the galvanizing layer in the nugget and HAZ (vaporized or melted) was compensated into the HEA initial composition profile, as shown in FIG. 20A. (FIG. 20A shows the initial chemical composition profile.)

The composition of each element was defined through the following equation:

$F(x) = C + D^* \mathrm{erf}((X-E)/F)$, where:

$C = (X_1 + X_2)/2$, where $X_1$ and $X_2$ are the concentrations of each element in the HEA side and iron side, respectively $D = X_2 - C$ E=location of the boundary between the two components (at 100 μm)

F=sharpness of the boundary (was set to be 5 μm).

The Zn composition in the HEA was set to be higher than its value in the designed equiatomic alloy (0.2 mole Zn) to take in all the incoming Zn (~2 mg) from the coating layer so that the HEA was assumed to be constituted of 0.27 mole Zn (and 0.1825 mole from each of the other four elements)

The steel composition was assumed to be 100% iron. The thickness of each component was assumed to be 100 μm. Double geometric mesh was utilized to have finer mesh around the centerline (interdiffusion region).

The phases that were introduced to the model were based on the Scheil solidification diagram. A simplified thermal profile was introduced to the model to mimic the literature data to simulate a welding process over a time of one second with a maximum temperature of 2100° C.

Figure 20B:
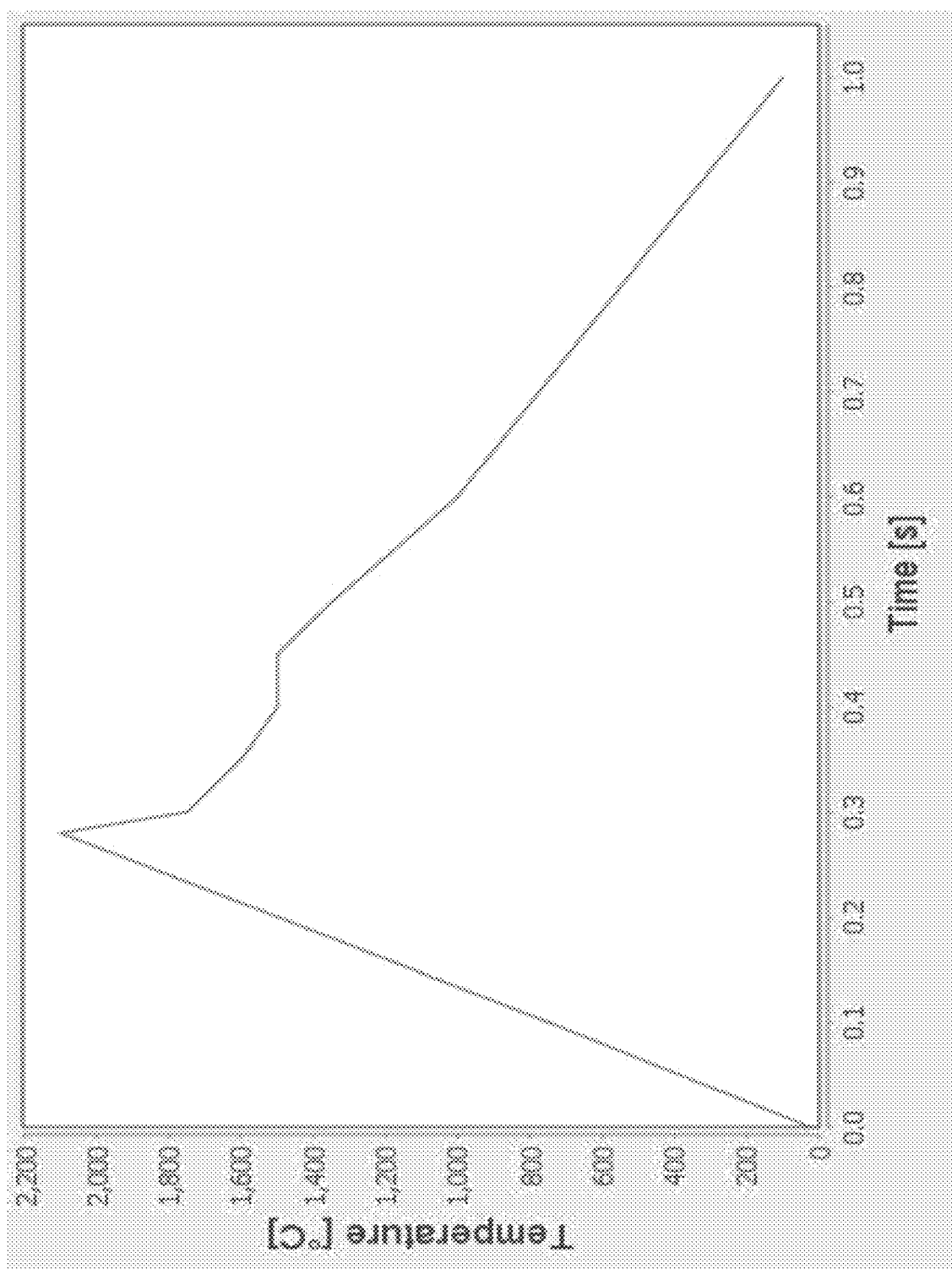
FIG. 20B shows the thermal profile for the diffusion modelling as described in Example VI.

FIG. 20B shows the thermal profile for the diffusion modelling.

Figure 21A:
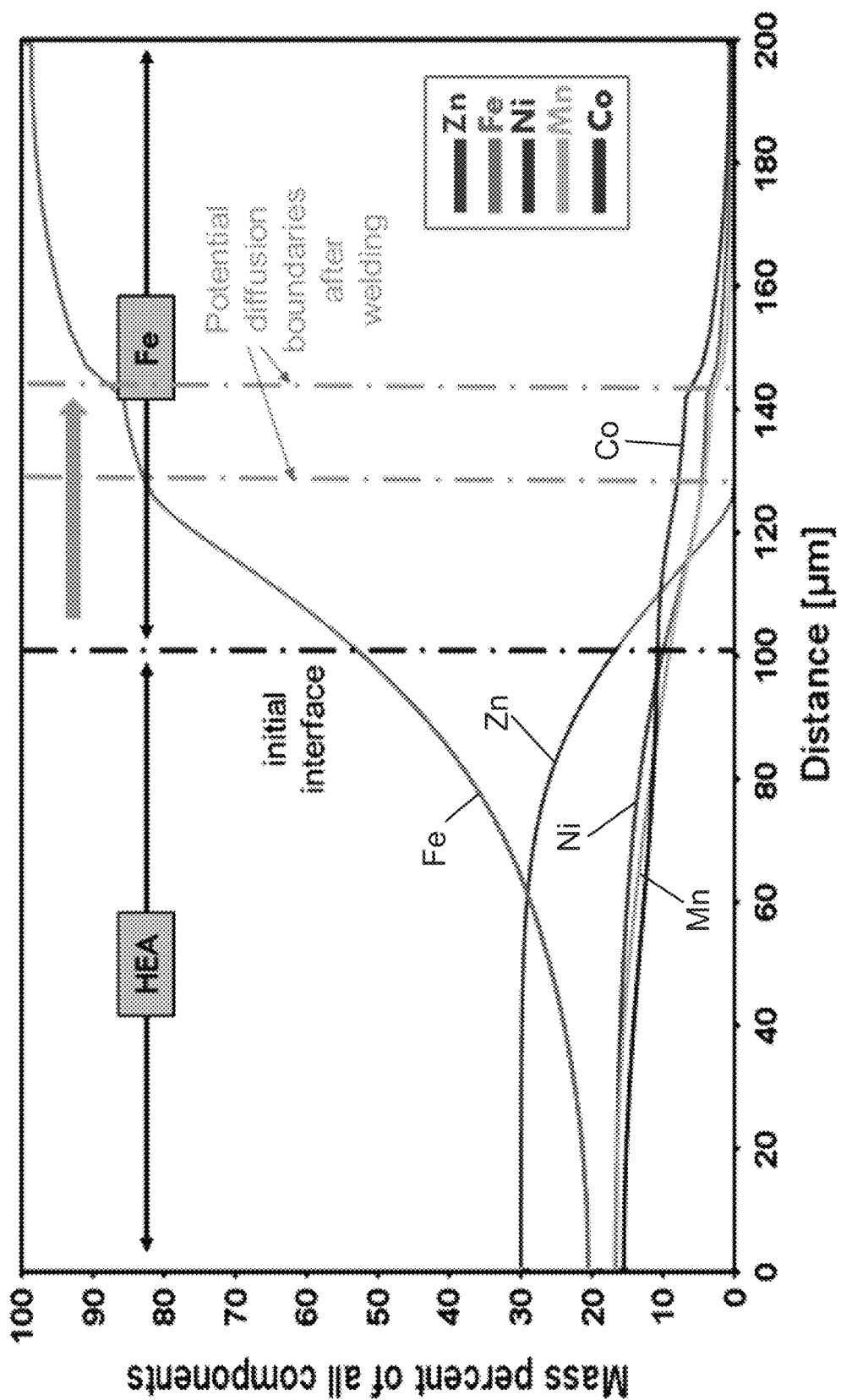
FIG. 21A shows the diffusion behavior of the HEA, specifically the composition profile after diffusion simulation, as described in Example VI.
Figure 21B:
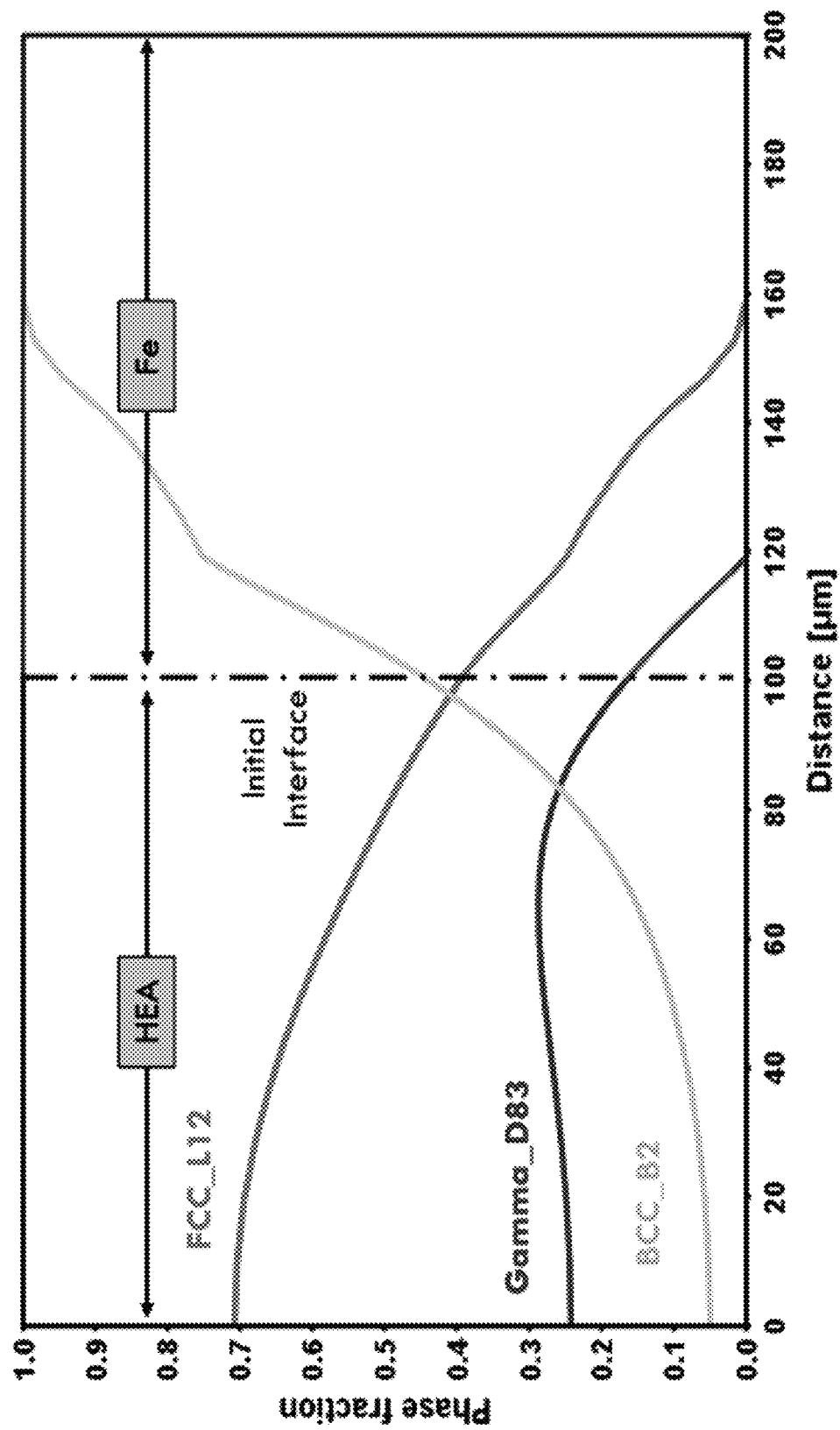
FIG. 21B shows the diffusion behavior of the HEA, specifically the predicted phases, as described in Example VI.

FIGS. 21A and 21B show the diffusion behavior of the HEA vs. steel (assumed 100% Fe). Specifically, FIG. 21A shows the composition profile after diffusion simulation, and FIG. 21B shows the predicted phases. As can be seen in these figures, Zn appeared to be the slowest element diffusing into the steel, as it stops after a distance of ~25 μm into the steel side. Co appeared to be the fastest element diffusing into the steel, followed by Ni and Mn. Potential diffusion boundaries appeared at 25 or 40 μm in the steel side. In FIG. 21B, phases predicted by the model to be present in the HEA (FCC+gamma) matched the phases calculated from the Scheil solidification diagram, while steel was presented as BCC, as only Fe was present in the steel side in this simulation.

Figure 22A:
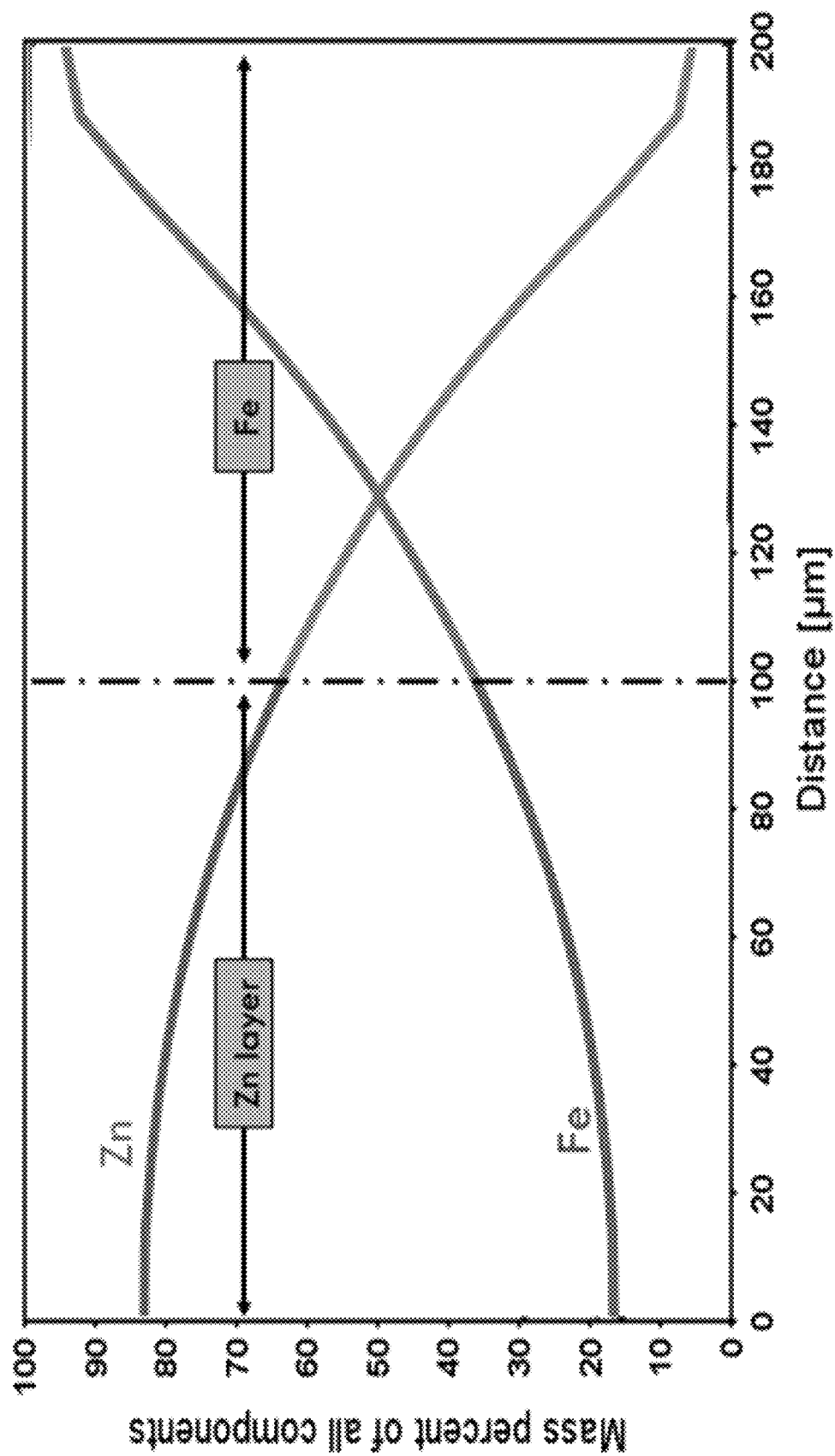
FIG. 22A shows the diffusion behavior of the Zn—Fe couple, specifically the composition profile after diffusion simulation, as described in Example VI.
Figure 22B:
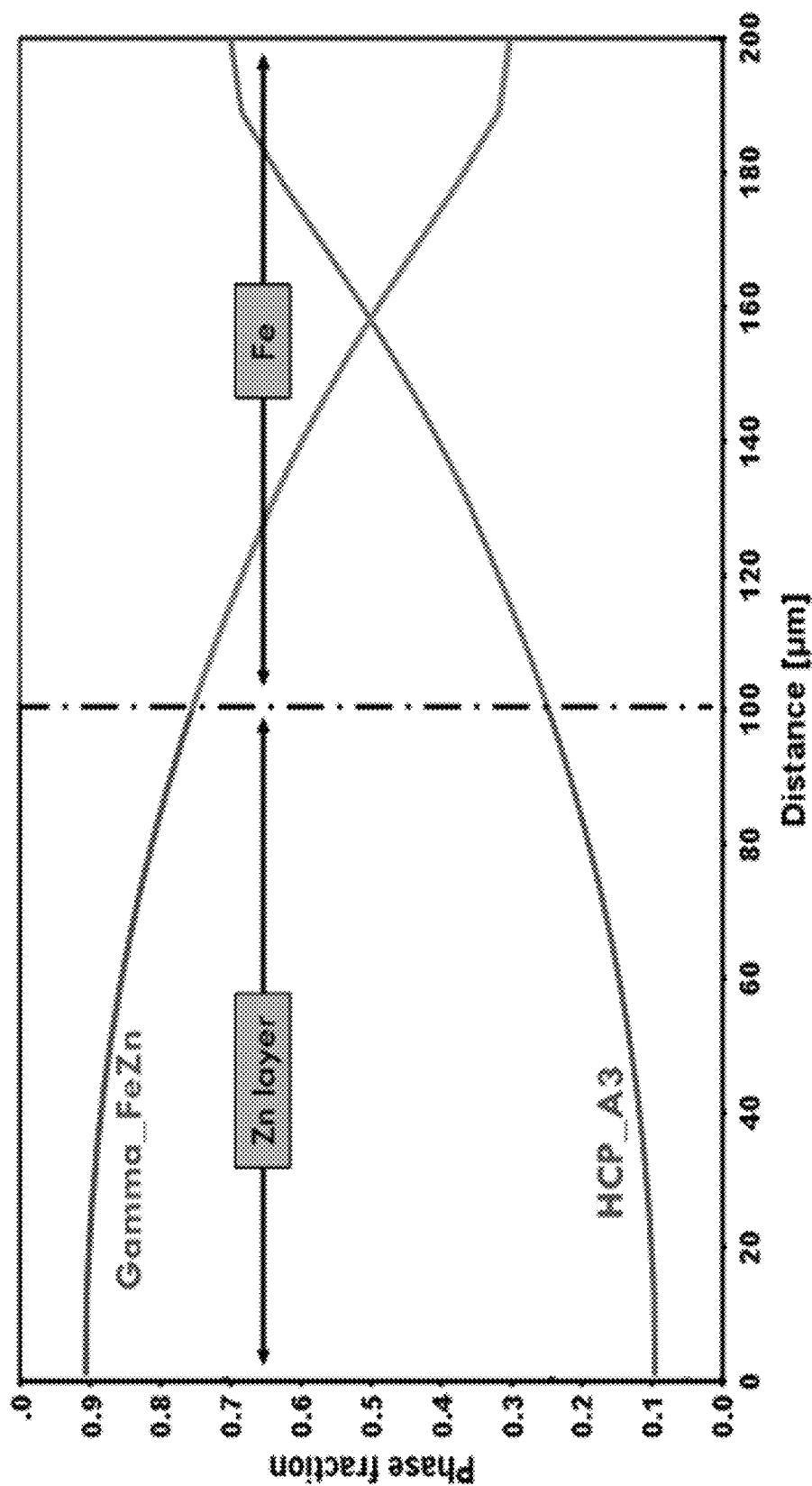
FIG. 22B shows the diffusion behavior of the Zn—Fe couple, specifically the predicted phases, as described in Example VI.

DICTRA diffusion modelling was also conducted for a Zn—Fe couple without the addition of the HEA to simulate the original condition. The same thermal profile as described above was applied except that the initial chemical composition profile was set for 100 wt. % Zn vs. 100 wt. % Fe with a 100 μm thickness on each side. Much deeper diffusion of both Zn and Fe into each other was observed. FIGS. 22A and 22B show the diffusion behavior of the Zn—Fe couple vs. steel (assumed 100% Fe). Specifically, FIG. 23A shows the composition profile after diffusion simulation, and FIG. 22B shows the predicted phases. Two phases were identified: Gamma_FeZn and a HCP phase.

Example VII: DICTRA Diffusion Modeling of HEA

Figure 23:
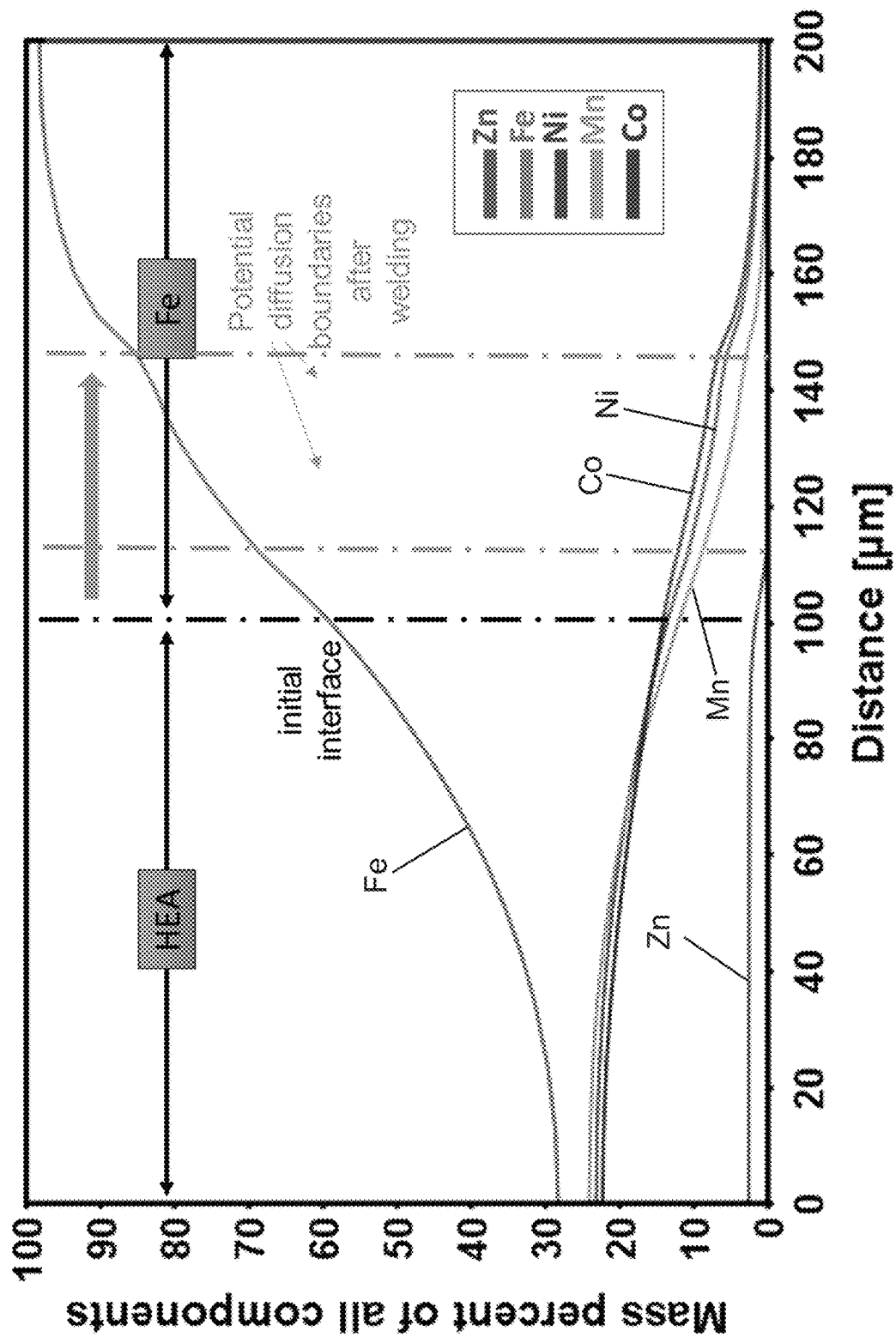
FIG. 23 shows the diffusion behavior of the HEA vs. steel, specifically, the composition profile after diffusion simulation, as described in Example VII.

The process described in EXAMPLE VI was repeated for an example HEA consisting of Fe, Mn, Ni, and Co. FIG. 23 shows the diffusion behavior of the HEA vs. steel (assumed 100% Fe), specifically, the composition profile after diffusion simulation. As seen in FIG. 23, the Zn diffusion stopped after 10 μm into the Fe side.

Example VIII: Optical Microscopy of RSW Samples

Four steel samples were prepared in order to study the effects of an HEA on a resistance spot welding (RSW) process. First, a control sample was prepared by welding two steel sheets using welding parameters of 9.5 kA, 26 cycles, and 800 pounds. A dome-shaped welding electrode (TB-25-TUFF) was used. No HEA was used in the control sample.

One inventive sample was also prepared using two steel sheets and the welding parameters described above with using the same welding electrode (dome shaped) in order to avoid foil separation away from the steel sheets as the electrode pressed on the joint. The inventive sample additionally contained an HEA foil on each of the two outer surfaces of the spot weld enclosing the top and bottom of the joint. The HEA consisted of Fe, Ni, Co, and Mn.

Figure 24A:
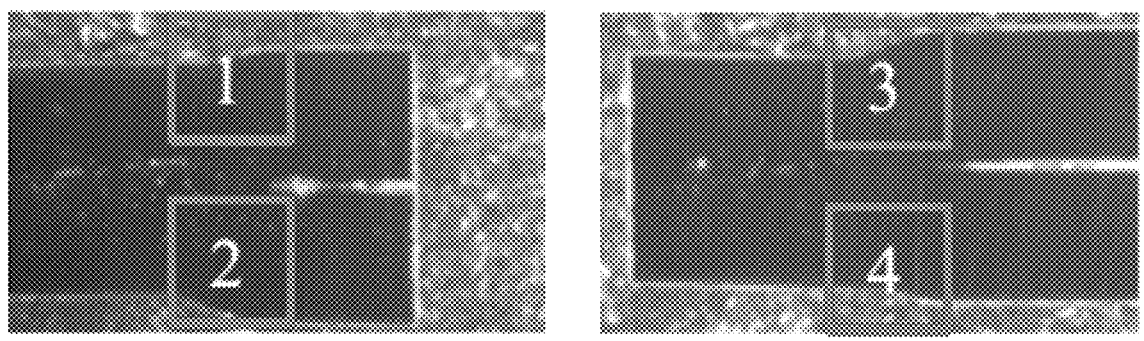
FIG. 24A shows a photograph of two cross sections of the control sample as described in Example VIII.
Figure 24B:
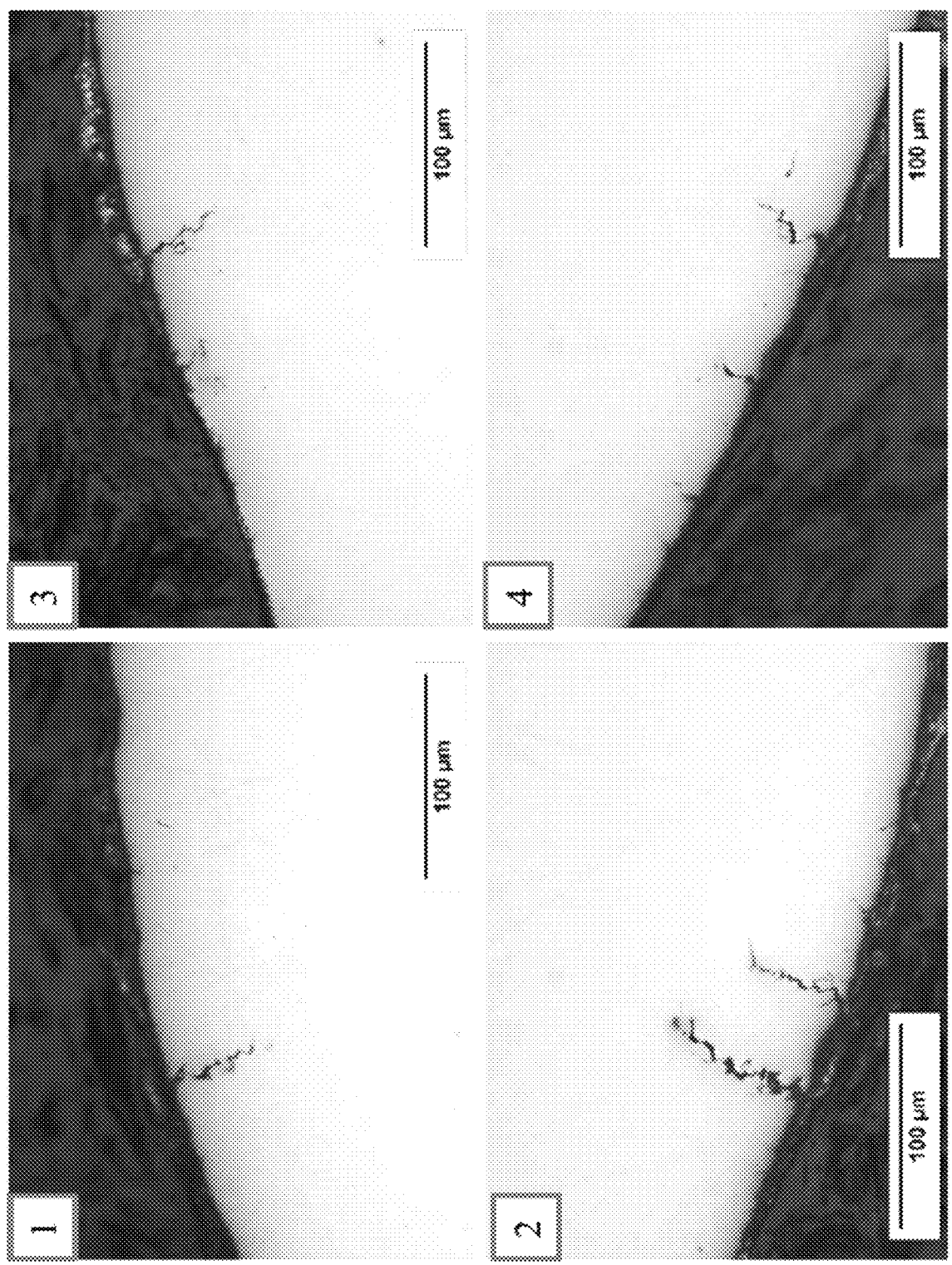
FIG. 24B shows optical micrograph images of the control sample as described in Example VIII.

FIG. 24A is a photograph of two cross sections of the control sample. FIG. 24B shows optical micrographs of the control sample at the locations designated 1, 2, 3, and 4 in FIG. 24A. As shown in FIG. 24B, the optical micrographs show type-1 LME cracks occurring at the edge of the electrode indentation on the steel sheet (weld shoulder). The crack length range was about 10 to 100 µm.

Figure 25A:
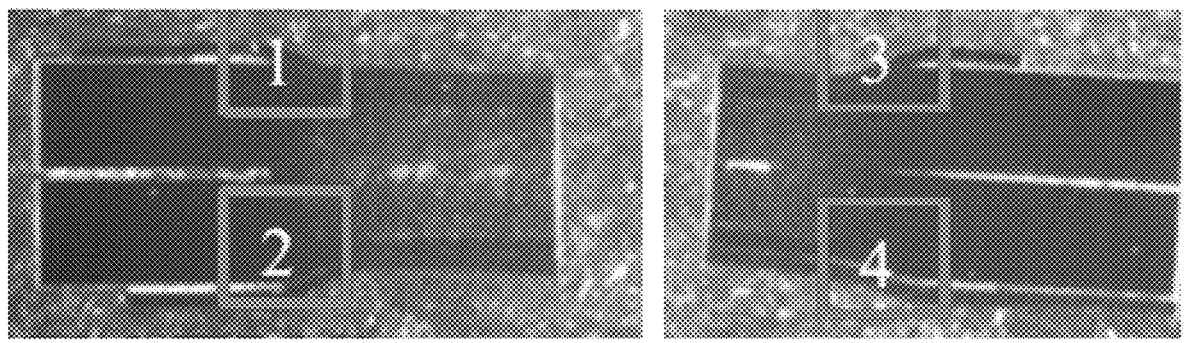
FIG. 25A shows a photograph of two cross sections of the inventive sample as described in Example VIII.
Figure 25B:
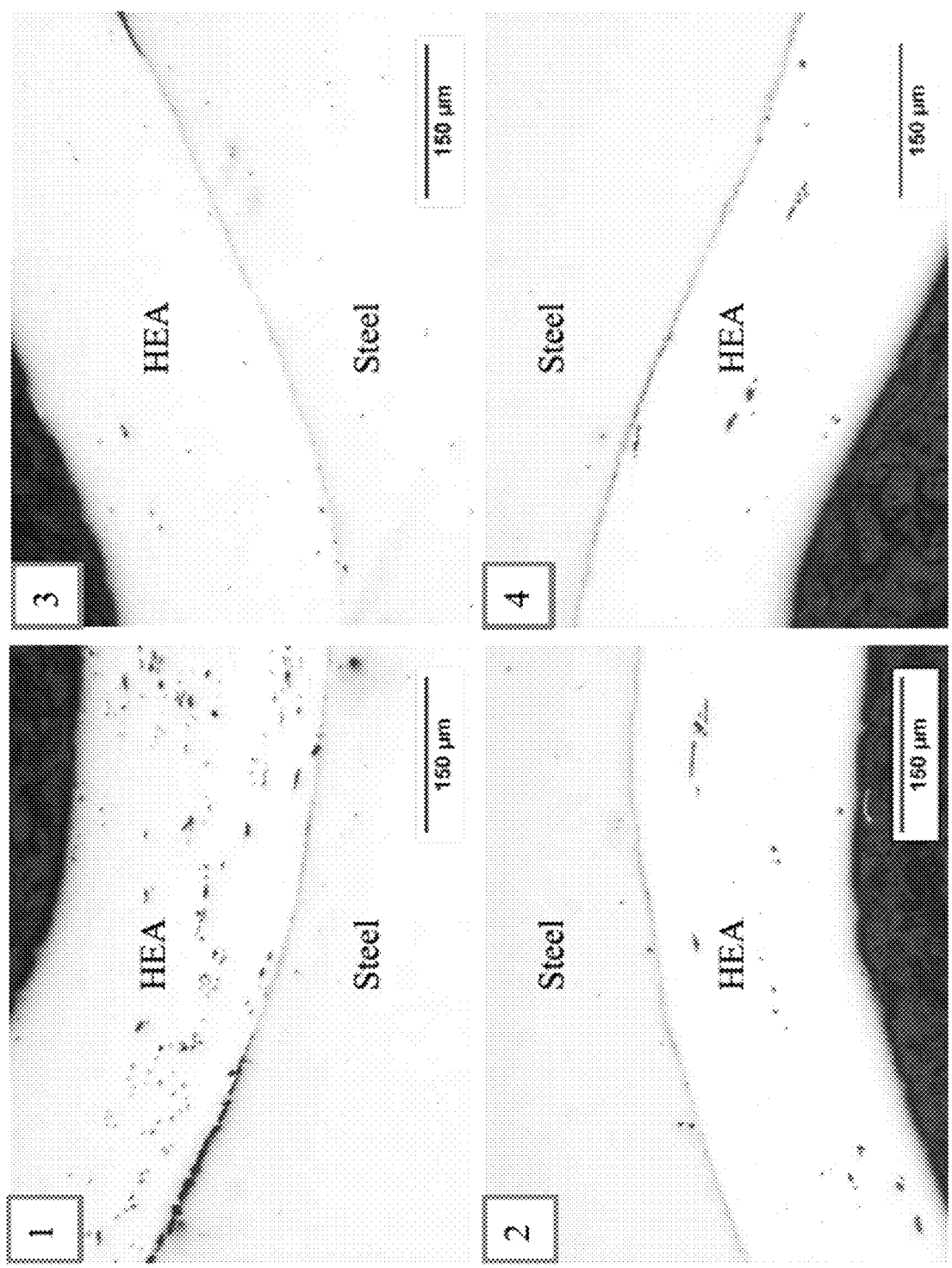
FIG. 25B shows optical micrograph images of the inventive sample as described in Example VIII.

FIG. 25A shows a photograph of two cross sections of the inventive sample. FIG. 25B shows optical micrograph of the inventive sample at the locations designated 1, 2, 3, and 4 in FIG. 25A. As shown in FIG. 25B, the optical micrographs show the absence of LME cracks in the inventive sample, especially at the same locations where LME cracks were observed in the control sample.

What is claimed is:

1. A multi-material component comprising:
   a first member;
   a second member; and
   a third member joining the first member to the second member,
   wherein at least one of the first member and the second member comprises iron and has a coating, wherein the coating comprises Zn,
   wherein the third member comprises a high entropy alloy comprising at least four principal major elements, and
   wherein one of the at least four principal major elements is Co.

2. The multi-material component of claim 1, wherein one of the at least four principal major elements is Cu.

3. The multi-material component of claim 1, wherein one of the at least four principal major elements is Fe.

4. The multi-material component of claim 1, wherein one of the at least four principal major elements is Mn.

5. The multi-material component of claim 1, wherein one of the at least four principal major elements is Ni.

6. The multi-material component of claim 1, wherein one of the at least four principal major elements is Zn.

7. The multi-material component of claim 1, wherein the high entropy alloy comprises at least one principal minor element, wherein the at least one principal minor element comprises Zn.

8. The multi-material component of claim 1, wherein two of the at least four principal major elements are Cu and Zn.

9. The multi-material component of claim 1, wherein one of the at least four principal major elements is Cu, and wherein the high entropy alloy further comprises at least one principal minor element, the at least one principal minor element comprising Zn.

10. The multi-material component of claim 1, wherein both of the first member and the second member comprise iron and have a coating, wherein the coating comprises Zn.

11. The multi-material component of claim 1, wherein the third member is at least partially positioned between the first member and the second member, and wherein the first member is spot welded to the third member and the second member is spot welded to the third member.

12. The multi-material component of claim 1, wherein the high entropy alloy comprises a mixing entropy of greater than 1.5R.

13. A multi-material component comprising:
   a first member comprising a first metal or a first metal alloy;
   a second member comprising a second metal or a second metal alloy; and
   a third member joining the first member to the second member,
   wherein at least one of the first metal or first metal alloy and the second metal or second metal alloy comprises iron and has a coating, wherein the coating comprises Zn,
   wherein the third member comprises a high entropy alloy comprising at least four principal major elements,
   wherein one of the at least four principal major elements is Cu.

14. The multi-material component of claim 13, wherein one of the at least four principal major elements is Fe.

15. The multi-material component of claim 13, wherein one of the at least four principal major elements is Mn.

16. The multi-material component of claim 13, wherein one of the at least four principal major elements is Ni.

17. The multi-material component of claim 13, wherein one of the at least four principal major elements is Zn.

18. The multi-material component of claim 13, wherein the high entropy alloy comprises at least one principal minor element, wherein the at least one principal minor element comprises Zn.

19. The multi-material component of claim 13, wherein both of the first member and the second member comprise iron and have a coating, wherein the coating comprises Zn.

20. The multi-material component of claim 13, wherein the third member is at least partially positioned between the first member and the second member, and wherein the first member is spot welded to the third member and the second member is spot welded to the third member.

21. The multi-material component of claim 13, wherein the high entropy alloy comprises a mixing entropy of greater than 1.5R.

22. A method of making a multi-material component comprising:
   providing a first member;
   providing a second member; and
   joining the first member to the second member with a third member comprising a high entropy alloy to form the multi-material component,
   wherein at least one of the first member and the second member comprises iron steel having and has a coating, wherein the coating comprises Zn,
   wherein the high entropy alloy comprises at least four principal major elements, and
   wherein one of the at least four principal major elements is Co, Cu, or Zn.

23. The method according to claim 22, wherein both of the first member and the second member comprise iron and have a coating, wherein the coating comprises Zn.

* * * * *